United States Patent
Kellman

(10) Patent No.: US 7,052,277 B2
(45) Date of Patent: May 30, 2006

(54) SYSTEM AND METHOD FOR ADAPTIVE LEARNING

(75) Inventor: Philip J. Kellman, Pacific Palisades, CA (US)

(73) Assignee: Kellman A.C.T. Services, Inc., Pacific Palisades, CA (US)

( * ) Notice: Subject to any disclaimer, the term of this patent is extended or adjusted under 35 U.S.C. 154(b) by 0 days.

(21) Appl. No.: 10/020,718

(22) Filed: Dec. 14, 2001

(65) Prior Publication Data

US 2005/0196730 A1  Sep. 8, 2005

(51) Int. Cl.
*G09B 7/00* (2006.01)
*G09B 19/00* (2006.01)

(52) U.S. Cl. .................. 434/118; 434/322; 434/323
(58) Field of Classification Search ................ 434/118, 434/322, 323
See application file for complete search history.

(56) References Cited

U.S. PATENT DOCUMENTS

| | | | |
|---|---|---|---|
| 3,748,754 A | 7/1973 | LaBerge | |
| 4,622,013 A | 11/1986 | Cerchio | |
| 4,772,206 A | 9/1988 | Kerr et al. | |
| 4,979,137 A | 12/1990 | Gerstenfeld et al. | |
| 5,540,589 A * | 7/1996 | Waters | 434/156 X |
| 5,545,044 A | 8/1996 | Collins et al. | |
| 5,577,186 A | 11/1996 | Mann, II et al. | |
| 5,577,919 A * | 11/1996 | Collins et al. | 434/322 X |
| 5,595,488 A | 1/1997 | Gozlan et al. | |
| 5,597,312 A | 1/1997 | Bloom et al. | |
| 5,602,982 A | 2/1997 | Judd et al. | |
| 5,618,182 A | 4/1997 | Thomas | |
| 5,727,950 A | 3/1998 | Cook et al. | |
| 5,863,208 A * | 1/1999 | Ho et al. | 434/362 |
| 5,870,731 A | 2/1999 | Trif et al. | |
| 5,888,074 A | 3/1999 | Staplin et al. | |
| 5,911,581 A | 6/1999 | Reynolds et al. | |
| 6,022,221 A * | 2/2000 | Boon | 434/156 X |
| 6,053,737 A | 4/2000 | Babbitt et al. | |
| 6,077,077 A | 6/2000 | Geipe | |
| 6,077,085 A | 6/2000 | Parry et al. | |
| 6,086,382 A | 7/2000 | Thomas | |
| 6,112,049 A | 8/2000 | Sonnenfeld | |
| 6,125,358 A | 9/2000 | Hubbell et al. | |
| 6,155,834 A | 12/2000 | New, III | |

(Continued)

FOREIGN PATENT DOCUMENTS

EP   0 838 798 A1   4/1998

OTHER PUBLICATIONS

Ahissar, Merav, et al.; "Task difficulty and the specificity of perceptual learning," Nautre; May 1997; pp. 401-406; vol. 387.

(Continued)

*Primary Examiner*—Chanda L. Harris
(74) *Attorney, Agent, or Firm*—Christie, Parker & Hale, LLP

(57) ABSTRACT

An adaptive learning system and method ("ALS") for optimized, automated learning is disclosed. The optimal sequencing method is adaptive in the sense that it continuously monitors a student's speed and accuracy of response in answering a series of questions, performing a series of classification tasks, or performing a series of procedures, and modifies the sequencing of the items presented as a function of these variables. One goal of the technique is to teach the subject matter in the shortest possible time. The optimal sequencing method may be used independently or in conjunction with disclosed perceptual learning and hinting methods.

41 Claims, 12 Drawing Sheets

U.S. PATENT DOCUMENTS

| | | | |
|---|---|---|---|
| 6,164,975 | A | 12/2000 | Weingarden et al. |
| 6,199,030 | B1 | 3/2001 | Stone |
| 6,201,948 | B1 | 3/2001 | Cook et al. |
| 6,206,700 | B1 | 3/2001 | Brown et al. |
| 6,231,344 | B1 | 5/2001 | Merzenich et al. |
| 6,270,352 | B1* | 8/2001 | Ditto ............... 434/118 X |
| 6,290,504 | B1 | 9/2001 | Benitz et al. |
| 6,328,569 | B1 | 12/2001 | Jenkins et al. |
| 6,419,496 | B1 | 7/2002 | Vaughan, Jr. |
| 6,422,869 | B1 | 7/2002 | Nagarajan et al. |
| 6,457,975 | B1 | 10/2002 | Miranda et al. |
| 6,523,007 | B1 | 2/2003 | Layng et al. |
| 6,527,556 | B1 | 3/2003 | Koskinen |
| 2001/0041330 | A1* | 11/2001 | Brown et al. ........... 434/332 X |
| 2002/0090600 | A1 | 7/2002 | Grant |
| 2002/0160347 | A1 | 10/2002 | Wallace et al. |
| 2002/0192624 | A1* | 12/2002 | Darby et al. ............ 434/236 |
| 2003/0027122 | A1 | 2/2003 | Stansvik |

OTHER PUBLICATIONS

Bennett, Robert, et al.; "The effect of training on visual alignment discrimination and grating resolution," Perception & Psychophysics; 1991; pp. 541-546; vol. 49 (6).

Chase, William G., et al.; "Perception in Chess," Cognitive Psychology; 1973; pp. 386-403; vol. 6.4.

Fahle, M., et al.; "Fast Perceptual Learning in Hyperacuity," Vision Research; 1995; pp. 3003-3013; vol. 35, No. 21.

Gibson, Eleanor J.; "Towards a Definition and a Taxonomy of Perceptual Learning," Principles of Perceptual Learning & Development; 1969; pp. 1-9.

Gibson, Eleanor J.; "A Differentiation Theory of Perceptual Development," Principles of Perceptual Learning & Development; 1969; pp. 75-83.

Gibson, Eleanor J.; "A Differentiation Theory of Perceptual Development: Principles and Mechanisms," Principles of Perceptual Learning & Development; 1969; pp. 95-117.

Gibson, Eleanor J., et al.; "Three Trends in Perceptual Development," Principles of Perceptual Learning & Development; 1969; pp. 450-471.

Gibson, James J., et al.; "Perceptual Learning : Differentiation or Enrichment?,"Psychological Review; 1955; pp. 33-41; vol. 62, No. 1.

Gibson, Eleanor J. et al.; "A Developmental Study of the Discrimination of Letter-Like Forms," Journal of Comparative and Physiological Psychology;1962; pp. 897-906; vol. 55, No. 6.

Goldstone, Robert; "Influences of Categorization on Perceptual Discrimination," Journal of Experimental Psychology: General; 1994; pp. 178-200; vol. 123, No. 2.

Karni, Avi, et al.; "The Time Course of Learning a Visual Skill," Nature; Sep. 1993; pp. 250-252; vol. 365, No. 6443.

Kellman, Philip J., et al.; "Modeling Perceptual Learning of Abstract of Invariants," Proceedings of the Twenty-First Annual Conference of the Cognitive Science Society; Aug. 1999; pp. 264-269; Lawrence Erlbaum Associates (LEA), Mahwah, New Jersey.

Kellman, Philip J., et al.; "Perceptual Learning Modules in Flight Training," Proceedings of the Human Factors and Ergonomics Society $38^{th}$ Annual Meeting; 1994; pp. 1183-1187.

Kellman, Philip J., et al.; "Training Pilots' Pattern Recognition Skills: Perceptual Learning Modules (PLMs) in Instrument Flight Training," Proceedings of the $2^{nd}$ Annual Embry-Riddle Aeronautical University Flight Instructor Conference; Apr. 1999; pp. 85-92; Embry-Riddle Aeronautical University Aeronautical Science Department; Daytona Beach, Florida.

Laberge, David, "Attention and The Measurement of Perceptual Learning," Memory & Cognition; 1973; pp. 268-276, vol. 1, No. 3.

Merzenich, Michael M., et al.; "Temporal Processing Deficits of Language-Learning Impaired Children Ameliorated by Training," Science; Jan. 1996; pp. 77-81, vol. 271 (5245).

Pick, Anne D.; "Improvement of Visual and Tactual Form Discrimination," Journal of Experimental Psychology; Apr. 1965; pp. 331-339, vol. 69, No. 4.

Reber, Arthur S.; "Implicit Learning of Artificial Grammars," Journal of Verbal Learning and Verbal Behavior; 1967; pp. 855-863, vol. 6.

Schneider, Walter, et al.; "Controlled and Automatic Human Information Processing: I. Detection, Search, and Attention," Psychological Review; 1977; pp. 1-66; vol. 84, No. 1.

Shiffrin, Richard M., et al.; "Controlled and Automatic Human Information Processing: II. Perceptual Learning, Automatic Attending, and a General Theory," Psychological Review; Mar. 1977; pp. 127-190; vol. 84, No. 2.

Silva, Ana B., et al.; "Perceptual Learning in Mathematics: The Algebra-Geometry Connection," Proceedings of the Twenty First Annual Conference of the Cognitive Science Society; Aug. 1999; 6 pages; Lawrence Erlbaum Associates (LEA), Mahwah, New Jersey.

Tallal, Paula, et al.; "Language Learning Impairment: Integrating Research and Remediation," Scandinavian Journal of Psychology; 1998; pp. 197-199; vol. 39, No. 3; Blackwell Publishers, U.K. and U.S.A.

Vogels, Rufin, et al.; "The Effect of Practice on the Oblique Effect in Line Orientation Judgments," Vision Research; 1985; pp. 1679-1687; vol. 25, No. 11.

Wise, Joseph A., et al.; "Perceptual Learning Modules in Mathematics and Science Instruction," Proceedings of the 2000 TechEd Conference, Amsterdam: IOS Press 2000; 9 pages.

* cited by examiner

*FIG. 3*

TABLE 1

| TRIAL | PROBLEM | RESPONSE | RESPONSE ACCURACY | TIME(SEC) | COMMENT |
|---|---|---|---|---|---|
| 1 | 7X7= | "49" | CORRECT | 3.5 | FAST, CORRECT RESPONSE. |
| 2 | 6X7= | "38" | WRONG | — | INCORRECT RESPONSE. |
| 3 | 7X4= | "28" | CORRECT | 18.4 | CORRECT BUT SLOW. |
| 4 | 12X7= | "72" | WRONG | — | |
| 5 | 6X7= | "42" | CORRECT | 11.7 | RECURRENCE OF PROBLEM MISSED ON TRIAL 2. |
| 6 | 9X9= | "72" | WRONG | — | |
| 7 | 12X7= | "84" | CORRECT | 10.4 | RECURRENCE OF PROBLEM MISSED ON TRIAL 4. |
| 8 | 5X8= | "40" | CORRECT | 2.6 | |
| 9 | 9X9= | "80" | WRONG | — | |
| 10 | 7X4= | "28" | CORRECT | 6.1 | RECURRENCE OF PROBLEM ANSWERED SLOWLY ON TRIAL 3. |
| 11 | 6X3= | "18" | CORRECT | 4.8 | |
| 12 | 9X9= | "74" | WRONG | — | RECURRENCE OF PROBLEM MISSED ON TRIAL 9. |
| 13 | 3X4= | "12" | CORRECT | 2.4 | |
| 14 | 6X7= | "32" | WRONG | — | RECURRENCE OF PROBLEM ANSWERED SLOWLY ON TRIAL 5. |
| 15 | 9X9= | "81" | CORRECT | 4.5 | RECURRENCE OF PROBLEM MISSED ON TRIAL 12. |
| 16 | 7X7= | "49" | CORRECT | 2.7 | RECURRENCE OF PROBLEM ANSWERED QUICKLY ON TRIAL 1. |
| 17 | 12X7= | "84" | CORRECT | 6.2 | RECURRENCE OF PROBLEM ANSWERED SLOWLY ON TRIAL 7. |
| 18 | 6X7= | "42" | CORRECT | 5.1 | RECURRENCE OF PROBLEM MISSED ON TRIAL 14. |
| 19 | 3X10= | "30" | CORRECT | 3.2 | |
| 20 | 7X4= | "28" | CORRECT | 3.9 | RECURRENCE OF TRIAL 10 PROBLEM. |

SAMPLE SEQUENCE OF TRIALS USING THE SEQUENCING ALGORITHM. RELEVANT PARAMETER VALUES: $a=1$, $b=2$, $D=2$, $W=12$, $K=1$. ARROWS INDICATE SELECTED EXAMPLES OFD PROBLEM RECURRENCES. (SEE TEXT.)

*FIG. 4*

TRIAL

| PROBLEM | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 7X7= | (1) | -.088 | 0 | .088 | .176 | .264 | .352 | .44 | .528 | .616 | .704 | .792 | .88 | .096 | 1.06 | (1.14) | .075 | .151 | .226 | .30 |
| 6X7= | 1 | (1) | -1.2 | 0 | (.2) | -.148 | 0 | .148 | .296 | .444 | .592 | .74 | .888 | (1.04) | -1.2 | 0 | .12 | (2.4) | .11 | .22 |
| 7X4= | 1 | 1 | (1) | -.2 | 0 | .202 | .404 | .606 | .808 | (1.01) | -.129 | 0 | .129 | .258 | .387 | .516 | .645 | .774 | .903 | (1.03) |
| 12X7= | 1 | 1 | 1 | (1) | -1.2 | 0 | (1.2) | -.158 | 0 | .158 | .316 | .474 | .632 | .79 | .948 | 1.10 | (1.26) | .123 | .245 | .358 |
| 9X9= | 1 | 1 | 1 | 1 | 1 | 0 | -1.2 | 0 | (1.2) | -1.2 | 0 | (1.2) | -1.2 | 0 | (1.2) | .102 | .204 | .307 | .409 | .511 |
| 5X8= | 1 | 1 | 1 | 1 | 1 | (1) | 1 | (1) | .07 | .14 | .21 | .28 | .35 | .42 | .49 | .56 | .63 | .70 | .77 | .85 |
| 6X3= | 1 | 1 | 1 | 1 | 1 | 1 | 1 | 1 | 1 | 1 | (1) | .106 | .212 | .318 | .424 | .530 | .636 | .742 | .848 | .954 |
| 3X4= | 1 | 1 | 1 | 1 | 1 | 1 | 1 | 1 | 1 | 1 | 1 | 1 | (1) | .068 | .137 | .205 | .273 | .341 | .409 | .477 |
| 3X10= | 1 | 1 | 1 | 1 | 1 | 1 | 1 | 1 | 1 | 1 | 1 | 1 | 1 | 1 | 1 | 1 | 1 | 1 | (1) | .083 |
| 8X4= | 1 | 1 | 1 | 1 | 1 | 1 | 1 | 1 | 1 | 1 | 1 | 1 | 1 | 1 | 1 | 1 | 1 | 1 | 1 | 1 |
| 4X12= | 1 | 1 | 1 | 1 | 1 | 1 | 1 | 1 | 1 | 1 | 1 | 1 | 1 | 1 | 1 | 1 | 1 | 1 | 1 | 1 |
| 3X9= | 1 | 1 | 1 | 1 | 1 | 1 | 1 | 1 | 1 | 1 | 1 | 1 | 1 | 1 | 1 | 1 | 1 | 1 | 1 | 1 |
| 8X7= | 1 | 1 | 1 | 1 | 1 | 1 | 1 | 1 | 1 | 1 | 1 | 1 | 1 | 1 | 1 | 1 | 1 | 1 | 1 | 1 |
| 11X5= | 1 | 1 | 1 | 1 | 1 | 1 | 1 | 1 | 1 | 1 | 1 | 1 | 1 | 1 | 1 | 1 | 1 | 1 | 1 | 1 |
| 6X8= | 1 | 1 | 1 | 1 | 1 | 1 | 1 | 1 | 1 | 1 | 1 | 1 | 1 | 1 | 1 | 1 | 1 | 1 | 1 | 1 |
| ... | | | | | | | | | | | | | | | | | | | | |

PRIORITY SCORES BY TRIAL FOR SAMPLE SEQUENCE IN FIGURE 3. COLUMNS INDICATE TRIALS; ROWS SHOW A PARTIAL LIST OF PROBLEMS IN THE DATABASE. CIRCLED PRIORITY SCORES INDICATE THE PROBLEM CHOSEN BY THE ALGORITHM FOR THAT TRIAL. PARAMETER VALUES: $a=.1$; $b=2$; $W=12$; $D=2$; $k=1$; $r=2$.

*FIG. 5*

| TRIAL | PROBLEM | RESPONSE | ACCURACY | RESPONSE TIME(SEC) | COMMENT |
|---|---|---|---|---|---|
| 1 | CAMINO | "ROAD" | CORRECT | 3.5 | FAST, CORRECT RESPONSE. |
| 2 | MARTES | "MARCH" | WRONG | — | INCORRECT RESPONSE. |
| 3 | DOS | "TWO" | CORRECT | 18.4 | CORRECT BUT SLOW. |
| 4 | VERDE | "DON'T KNOW" | WRONG | — | |
| 5 | ANARANJADO | "ANGEL" | WRONG | — | |
| 6 | MARTES | "TUESDAY" | CORRECT | 15.0 | RECURRENCE OF PROBLEM MISSED ON TRIAL 2. |
| 7 | ABRIL | "APRIL" | CORRECT | 10.4 | |
| 8 | FACIL | "EASY" | CORRECT | 2.6 | |
| 9 | VERDE | "GREEN" | CORRECT | 9.7 | RECURRENCE OF PROBLEM MISSED ON TRIAL 4. |
| 10 | ANARANJADO | "APPLE" | WRONG | — | RECURRENCE OF PROBLEM MISSED ON TRIAL 5. |
| 11 | VIERNES | "FRIDAY" | CORRECT | 4.8 | |
| 12 | AZUL | "BLUE" | WRONG | — | |
| 13 | DOS | "TWO" | CORRECT | 2.4 | RECURRENCE OF PROBLEM ANSWERED SLOWLY ON TRIAL 3 |
| 14 | NOVIEMBRE | "NOVEMBER" | CORRECT | 8.6 | |
| 15 | ANARANJADO | "ORANGE" | CORRECT | 11.3 | RECURRENCE OF PROBLEM MISSED ON TRIAL 10. |
| 16 | CERO | "ZERO" | CORRECT | 2.7 | |
| 17 | CAMINO | "ROAD" | CORRECT | 6.2 | RECURRENCE OF PROBLEM ANSWERED QUICKLY ON TRIAL 1 |
| 18 | MARTES | "TUESDAY" | CORRECT | 5.1 | RECURRENCE OF PROBLEM ANSWERED SLOWLY ON TRIAL 3 |
| 19 | HIJA | "DAUGHTER" | CORRECT | 3.2 | |
| 20 | EMPUJAR | "ORANGE" | WRONG | — | |

SAMPLE SEQUENCE OF TRIALS USING THE SEQUENCING ALGORITHM WITH PARAMETERS SET TO FAVOR INTRODUCTION OF NEW PROBLEMS: $a=.1$, $b=1.5$, $D=2$, $r=2$, $W=6$, $K=1.2$

FIG. 6

| PROBLEM | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| CAMINO | (1.2) | -.09 | 0 | .09 | .18 | .27 | .37 | .46 | .55 | .64 | .73 | .82 | .92 | 1.01 | 1.1 | 1.19 | (1.28) | -.09 | 0 | .09 |
| MARTES | 1.2 | (1.2) | -0.6 | 0 | .6 | (1.2) | -0.14 | 0 | .14 | .28 | .42 | .56 | .70 | .84 | .98 | 1.11 | 1.25 | (1.39) | -.08 | 0 |
| DOS | 1.2 | 1.2 | 1.2 | -0.16 | 0 | .16 | .32 | .49 | .65 | .81 | .97 | 1.13 | (1.3) | -.12 | 0 | .12 | .25 | .37 | .49 | .61 |
| VERDE | 1.2 | 1.2 | 1.2 | (1.2) | 0 | 0 | .6 | 1.2 | (1.8) | -0.12 | 0 | -0.12 | .23 | .345 | .46 | .58 | .69 | .81 | .92 | 1.04 |
| ANARANJADO | 1.2 | 1.2 | 1.2 | 1.2 | -0.6 | -0.6 | 0 | .6 | 1.2 | (1.8) | -0.6 | 0 | .6 | 1.2 | (1.8) | -.12 | 0 | .12 | .25 | .37 |
| ABRIL | 1.2 | 1.2 | 1.2 | 1.2 | (1.2) | 1.2 | (1.2) | .6 | 0 | .8 | .17 | .25 | .34 | .42 | .51 | .59 | .68 | .76 | .85 | .93 |
| FACIL | 1.2 | 1.2 | 1.2 | 1.2 | 1.2 | 1.2 | 1.2 | -.08 | -0.9 | 0 | 0.9 | .18 | .27 | .37 | .46 | .55 | .64 | .73 | .82 | .92 |
| VIERNES | 1.2 | 1.2 | 1.2 | 1.2 | 1.2 | 1.2 | 1.2 | (1.2) | 1.2 | 1.2 | (1.2) | -0.16 | 0 | .16 | .33 | .49 | .66 | .82 | .99 | 1.15 |
| AZUL | 1.2 | 1.2 | 1.2 | 1.2 | 1.2 | 1.2 | 1.2 | 1.2 | 1.2 | 1.2 | 1.2 | (1.2) | -0.7 | 0 | .07 | .13 | .20 | .26 | .33 | .40 |
| NOVIEMBRE | 1.2 | 1.2 | 1.2 | 1.2 | 1.2 | 1.2 | 1.2 | 1.2 | 1.2 | 1.2 | 1.2 | 1.2 | 1.2 | (1.2) | -.11 | 0 | .11 | .22 | .33 | .44 |
| CERO | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | (1.2) | -0.9 | 0 | 0.9 | .19 |
| HIJA | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | (1.2) | -0.6 |
| EMPUJAR | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | (1.2) |
| AMARILLO | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| LUNES | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| ROSADO | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |

TRIAL

PRIORITY SCORES BY TRIAL FOR SAMPLE SEQUENCE IN FIGURE 5. COLUMNS INDICATE TRIALS; ROWS SHOW A PARTIAL LIST OF PROBLEMS IN THE DATABASE. CIRCLED PRIORITY SCORES INDICATE THE PROBLEM CHOSEN BY THE ALGORITHM FOR THAT TRIAL. PARAMETER VALUES: $a=.1$; $b=1.5$; $W=6$; $D=2$; $k=1.2$; $r=2$.

SYSTEM AND METHOD FOR ADAPTIVE LEARNING

BACKGROUND

The field of the invention relates generally to learning systems and methods, and more particularly to systems which may be implemented using multimedia computer technology. The system and method of the present invention may be used for instruction in any number of subjects. Some aspects may be particularly useful in fields where teaching complex visuospatial concepts is required. Others are applicable whenever there is some set of items to be committed to memory.

Instructional and teaching systems have been in existence for centuries, but their development has increased significantly with the development of the digital computer and more recently with the development of multimedia technology. Presently, computers have been implemented in the learning process in many ways. Systems which present a series of static lessons separated by a prompt-response testing procedure which determines whether a student will be allowed to progress to the next lesson or return to additional instruction on the tested subject in another format are known. These methods monitor student progress and disseminate additional information as the student progresses. Also known are learning systems with material indexed by type and degree of difficulty, where the system selects an appropriate lesson according to user input and edits out parts of the lesson which are considered below the student's comprehension level. Other learning systems employ computer technology, but are limited in scope to particular fields of instruction, such as instruction in the use of computer programs, or are limited in format to specific media, such as text and simulation exercises.

Some prior art learning systems utilize a static lesson format which is typically arranged in a predefined order. This format forces each student to conform to a particular lesson format, presented in a particular order, which may not fit his or her specific needs. Recently, attempts have been made to overcome the drawbacks of the prior art by using computer technology to implement learning systems that dynamically adjust to the ability of the student in order to improve and/or accelerate the learning process.

Some recent attempts to develop dynamically adaptable learning systems have used a student's speed and accuracy in answering questions as criteria for changing the problems presented to a particular student. One such learning system is discussed in U.S. Pat. No. 6,077,085, entitled "Technology Assisted Learning," issued to Parry et al. This reference discloses a learning system directed towards language instruction. The −10 subject matter to be taught is subdivided into sets of conceptually related questions. Exemplary subjects are grammar principles, phrases, and vocabulary. Each set of conceptually related questions is spread across introductory, working, and test "pools" of questions. The program includes a question advancement/regression feature where a period of days must pass before questions from the introductory and working pools are presented to the student in the test pool. This feature is alleged to allow the program to assess whether the student has retained the subject matter in long term memory. In the test pool, questions are presented to the student sequentially and the student's mastery of the subject matter is evaluated based upon whether the student correctly answers each question and upon the relative speed of each correct response. If the student correctly answers the questions within predetermined time constraints, the questions are advanced into a review pool for future review. If a student struggles with a particular question, the question is regressed to a pool where the subject matter represented by the question may be taught in an easier manner. As questions are answered, the system calculates a dynamic average response time for the collective group of correct answers. In determining whether particular subject matter has been successfully mastered, the method compares the response time for questions about the particular subject matter to the student's dynamic average response time. The extent of advancement or regression through multiple question pools is a function of the particular question response time and the dynamic average response time.

Although Parry may be an improvement over prior art methods, the system has several potential drawbacks which provide less than optimal learning instruction. One potential drawback of Parry is that speed and accuracy in answering questions are only used to advance or regress questions from the current working pool. Within the working pool, Parry does not provide a mechanism for presenting questions to students in an order or arrangement most likely to lead to optimal learning based on the student's past answers to questions. Rather Parry repeats questions in a random sequence which is unlikely to lead to enhanced learning and provides little improvement over the prior art. Another drawback of Parry may be that the system will remove questions from the working pool based on a single correct answer on the first trial. The correctly answered question is moved to a review pool for review on a subsequent day in the belief that a delay of one or more days between repeating correctly answered questions improves long term memory. One problem with this approach is that the correct answer may have been the result of a guess. A single trial may often be insufficient to discriminate between learned and guessed answers. In addition, recent research indicates that long term memory is improved by slowly stretching the retention interval for learned questions. Thus, a new and preferable approach would be to repeat questions or problem types at increasing delay intervals and to remove the question from the working group only after the question has been correctly answered in multiple trials, where each trial occurs after a longer delay than the preceding trial.

In this context, a learning format that dynamically adapts to the strengths and weaknesses of each student may be desirable. Preferably, such a system may sequence the appearance order of learning items presented to a student in such a manner as to promote rapid learning of the subject matter. In addition, the learning system may be optimized for the development of long term memory. Ideally, the learning system may include the ability to retire well learned questions from the sequence after certain delay, repetition and success criteria are met. Also, such a system may include the ability to provide for the judicious use of hints to guide students to correct answers.

Another feature of existing learning systems is that they target specific, concrete items of learning, such as learning the Spanish equivalent of the English word "bread," or deciding whether a certain speech sound is an 'r' or an 'l'. Many important learning tasks involve grasping of some more abstract structure that applies to many different instances. An example would be the learning of particular transformations in algebra that allow one to derive new expressions from old. Such transformations, such as the distributive property of multiplication ($a(b+c)=ab+ac$, where $a$, $b$ and $c$ can be any constants, variables or more complicated expressions), are not learned when one has memorized a specific example. Rather, one learns to see the distributive structure in many different contexts. Other examples would be learning to sort leaves of two different species of plants, or the classification of chemical structures into chemical families, or the determination of pathology vs. normal variation in mammograms, in which many properties vary across individual cases.

These aspects of learning are generally not addressed in the existing art of computer-based learning technology. Most often, learning targets specific items of declarative knowledge. Learning structures, abstract patterns, or the determinants of important classifications is not optimized, and may be impeded, by typical formats in the prior art. The reason is that any specific instance of a structure, or any small set of instances, will have individual characteristics that are not part of the concept to be learned. New techniques of learning are required to help the learner extract the invariant or diagnostic structural features or relations that define the concept. A learner who knows what a tractor looks like can correctly classify new tractors despite variations in their color, size and specific features (e.g., he or she can even recognize a miniature, toy tractor without prior experience). A learner who is just learning the term "tractor" in connection with only one or a couple of examples may think that the concept requires that the item be yellow, or have a certain size, etc. As predicted by concepts of simple associative learning, incidental accompanying features will be connected to the item learned. Thus, when a radiologist trainee sees a certain example of pathology in a mammogram, and the pathological part lies in the upper left quadrant of the left breast, and is a 1 cm nodule, he or she will have an implicit tendency to associate all of those features with the diagnosis of pathology. Yet, the actual structural features that determine pathology have little to do with the exact location or size, but rather with properties of shape and texture in the image.

A system for the learning of invariant or diagnostic structure, as opposed to memorization of instances, may desirably be built using different techniques from those in the prior art. Specifically, such a learning system would contain a set of learning instances for each concept to be learned, such that examples of the same concept varied in their irrelevant features. The learning system would preferably require the learner to make many classifications of varying instances, and feedback would be provided. This kind of learning format allows a filtering process to occur, leading to discovery of the diagnostic structures or patterns, while extracting them becomes more efficient and automatic. This kind of learning system exploits the ability of the human attentional system to extract invariant or diagnostic structure from among irrelevant variation. Much of what is learned this way is implicit and not verbalizable; thus, it cannot be taught well through lectures or computer-based tutorial formats that emphasize declarative knowledge (explicit facts and concepts). Yet, this fluent pickup of structure and efficient classification—called perceptual learning or structure learning—are important parts of expertise in almost every learning domain. However, systematic techniques to utilize this ability in learning technology have not been previously developed. Such systems would preferably aid learning in many contexts, including science, mathematics, language and many professional and commercial applications. Because they encourage extraction of diagnostic structure, they would be well suited for teaching not only structure in a domain, but structure mappings across multiple representations, such as graphs and equations in mathematics, or molecular structures and notation in chemistry.

SUMMARY

The adaptive learning system and method ("ALS") of the present invention preferably includes one or more desirable features not found in existing systems. Various embodiments of the ALS may include generally one or more of the following interrelated learning techniques; question sequencing, perceptual learning with structured display sets, and problem hinting. The ALS is preferably adaptive in the sense that it continuously monitors a student's speed and accuracy of response in answering a series of questions and modifies the order or sequence of the questions presented as a function of the speed and accuracy criteria. The ALS may also be used to teach a wide range of subjects. One or more of its features may be useful for teaching subjects which require an individual to recognize and rapidly react to complex multidimensional patterns, whereas others introduce new efficiencies into learning situations that require memorization of particular items of information.

In one exemplary embodiment, the question sequencing portion of the ALS may be based on a novel optimal sequencing algorithm ("OSA"). The OSA may apply to both situations in which particular items must be remembered (instance learning) and contexts in which learning involves structural invariants that apply across many different instances (perceptual, concept or structure learning). An example of instance learning would be the learning of an item in the multiplication tables, e.g., 7×8=56. An example of structure learning would be learning the features and patterns that characterize pathology in a mammograms. As will be elaborated below, in one embodiment of the present system for perceptual or structure learning, an individual problem type does not consist of a single instance that is repeated. Thus, repeated trials of a particular concept or problem type involve new specific instances. The sequencing algorithm of this embodiment may apply both to the sequencing of specific memory items in instance learning and to the learning of problem types or concepts in perceptual learning.

As the student progresses through the questions or learning items, our embodiment of the OSA varies the questions presented depending on the student's answers to prior questions. In this embodiment, the technique preferably teaches the subject matter in the shortest possible time and to maximize retention. The OSA sequences the presentation order of the questions presented based on criteria including, by way of example: 1) the accuracy of each answer; and 2) the response time for each correctly answered question. Using these criteria, the OSA assigns a "reappearance priority" or priority score to each question. Priority scores may be updated after each learning trial. The algorithm modifies question sequencing by implementing the following concepts each of which are adjustable parameters that optimize learning speed and the retention of concepts learned.

Another embodiment of the OSA includes a delay requirement which prohibits repetition of the same question on successive learning trials. This enforced delay in reappearance is an adjustable parameter. This feature requires the learner to exercise and improve long-term memory retrieval processes rather than short-term memory processes.

Still another embodiment of the OSA provides for short reappearance intervals for missed or slowly answered questions. The algorithm may continuously update the priority score for each question set as the student works through the questions. As the student develops an answer history, incorrectly answered questions may be given a higher priority score and therefore reappear more frequently than correctly answered questions.

Still another embodiment of the OSA provides for stretched retention intervals as learning improves. The algorithm automatically increases the reappearance interval as learning of particular items or types improves. In other words, for a particular item, the reappearance interval is lengthened as the response time decreases (for correct answers). This may be accomplished by the lowering the reappearance priority score for an item as response time decreases. This stretching of the retention interval exploits two known characteristics of human memory to improve long-term retention. As an item becomes better learned, its memory representation is strengthened. As this occurs, the interval at which the item must be tested to produce the maximum increment in learning lengthens. The OSA in this embodiment appropriately, gradually and automatically lengthens the retention interval based on accuracy and speed data that indicate the strength of current learning. The particular values for these increases as learning improves are parameter adjustable for different material and even different learners. The system is also self-correcting. If the retention interval in a certain instance is stretched too far so that the learning of that item has decayed, the subject will give an incorrect or slow answer. These new data will in turn help ensure that the item reappears sooner, i.e., the retention interval will be shortened depending on the subject's performance. Thus, in this embodiment, the reappearance of individual items may be tuned to the subject's learning of them, whether or not that learning is monotonically improving.

In another embodiment, the ALS uses a learning criterion for problem retirement. The ALS retires questions from the problem set after a predetermined learning criterion is met. The learning criterion is based on response speed, accuracy, and the number of successful trials. For example, a problem may be retired after it has been answered correctly on its last three presentations in under "n" seconds. This feature gives an objective measure of what has been learned. Learning to an appropriate criterion also improves long term retention of the subject matter. Further, problem retirement allows the learner to focus on the questions where improvement is needed. Features of the learning criterion may be parameter adjustable. The feature of a sequence of correct trials meeting a response time criterion helps ensures that learning and some degree of automaticity have occurred. For different kinds of material, different numbers of consecutive correct trials may be required for the learning criterion, depending on the degree of automaticity desired in the learner.

In yet another embodiment, the ALS provides a "scaffolding" function where each question in a question set may be assigned an initial priority score. This feature may be useful where it is desired to initially present questions in order of increasing difficulty or where it is desirable to have a student learn certain subject matter early in the course of questions.

The ALS of the present invention may also incorporate perceptual learning techniques in the form of perceptual learning modules. Perceptual learning teaches a student to recognize particular structural elements and in some applications to map those elements across multiple representations in various learning domains. This technique typically may involve the use of complex visuospatial displays and is particularly relevant to learning mathematical representations of two or three dimensional structures as well as many commercial and military applications in which relations need to be extracted from information that appears on a variety of instruments, gauges, CRT displays or other sources. One particular application is the teaching of detection of airspace conflicts on air traffic control screens. Another is the recognition of allowable transformations of expressions in solving equations in algebra.

In still another embodiment, the system incorporates novel techniques that allow diagnostic structure (defining of the category or concept) to be learned whereas nonessential attributes (irrelevant to the concept) are filtered out. Specifically, two kinds of systematic variation may be incorporated in display sets to systematically decorrelate irrelevant attributes and isolate diagnostic structure. These two kinds of variation may apply, for example, to positive and negative instances of the concept to be learned. First, positive instances of a category may vary across learning trials, in the features that are irrelevant for determining their membership in the category. Second, positive instances may be contrasted within or across learning trials with items that do not exemplify the concept (negative instances), yet these negative instances must share similar irrelevant features. To learn "tractor," for example, positive instances (tractors) should vary in their colors, sizes and other nonessential features. Negative instances (non-tractors, e.g., trucks) share values on irrelevant dimensions with the positive instances (i.e., they share the colors, sizes, and other irrelevant features of the tractors). The systematic construction of display sets containing these sorts of variation within the positive instance set and the negative instance set are exemplary aspects of this embodiment that produce effective structure learning.

Perceptual learning in some cases may require repeating many short trials at high speed to develop pattern recognition abilities. This feature may be referred to as a "speeded classification trial." Typically, the student must make a quick or "speeded" judgment about displays corresponding to a particular criterion. There are several procedural variants. One is a pattern classification format. In air traffic control, for example, the learner may view a complex display of air traffic represented as icons for aircraft and make a speeded choice on each trial regarding whether the pattern contains a traffic conflict. In algebraic transformations, the learner may view an equation. A second equation appears below, and the learner makes a speeded choice of whether or not the second equation is a lawful transformation of (i.e., is derivable from) the first equation.

In the air traffic control example, scanning for the relevant visual relationships that indicate conflicts improves when the user must search for the relevant structure in a large number of speeded classification trials using different displays. In the algebraic transformations case, many short classification trials leads to automatic recognition of allowable transformations.

A second procedural variant is pattern comparison. Here, two or more displays are shown adjacent to each other. One display contains the target or correct structure; the others do not. The student must select the correct display under time pressure. In algebraic transformations, the learner would see the starting equation and two or more choices. One choice would be an equation that is derivable from the starting equation, while the others would not be. In a chemistry module, the learner may make a forced choice of which of two molecules displayed has the structure that makes it belong to a particular chemical family. In another example, an art history student may be told to select which of three small patches of paintings contains Renoir's brush strokes.

A radiology student might have to spot which of two mammograms presented on each trial shows pathology. Across many short trials, the search for structure in paired or multiple displays facilitates the discovery of crucial features and relations relevant to the important classifications that need to be learned. Perceptual learning is applicable to many educational fields, such as mathematics and science, as well as many vocational and professional fields.

The above examples involve structure discovery, in which the goal of the problem set is to produce accurate and fluent use of some concept or classification. In structure mapping across multiple representations, the student may be presented with an item and must assess its match or mismatch to the same structure given in a different representation. For example, in a mathematics module, an equation of a function might be presented, and the student must decide whether a certain graph represents the same function or not (pattern classification). Alternatively, the student may be required to select which of three graphs matches the symbolic representation of the function (or vice versa). In a chemistry module, for example, the student may view a representation of a rotating molecule and make a forced choice of which of two diagrams in chemical notation accurately represents the molecule (pattern comparison).

Across many learning trials, the relevant visuospatial structures for a particular classification or concept will be acquired by human attentional processes if the invariant or diagnostic structure must be located or compared within many different contexts of irrelevant background variation. For example, in the learning of botany, many examples of one plant family will likely vary in numerous ways, but they will all share some characteristics that make them different from members of another plant family. Perceptual learning methods allow the user to extract this diagnostic structure while filtering out irrelevancies.

In another embodiment, the ALS may also include a hinting algorithm which may be integrated within the sequencing algorithm and/or the perceptual learning modules. In the hinting algorithm, when a question is answered incorrectly, or after the passage of a particular time interval, the hinting algorithm automatically generates for the student a "hint" specific to the particular question being answered. If the student fails to answer the question correctly after the first hint, the student may be given subsequent hints. Each hint may be designed in the exemplary embodiment to trigger or suggest the correct answer to the question. Hints are generated automatically based on structural relations in the subject matter domain and on the student's prior performance on related learning trials. The hinting algorithm automatically varies the types of hints used for particular items across learning trials. These and other features of the invention will become more apparent from the following detailed description of the invention, when taken in conjunction with the accompanying exemplary drawings.

BRIEF DESCRIPTION OF THE DRAWINGS

FIG. 3 is a sample of twenty learning trials presenting twenty learning items and exemplary student response data.

FIG. 4 is an example of the priority scores calculated for the data presented in FIG. 3.

FIG. 5 is another sample of twenty learning trials presenting twenty learning items and exemplary student response data.

FIG. 6 is an example of the priority scores calculated for the data presented in FIG. 5.

DESCRIPTION OF THE PREFERRED EMBODIMENT

Throughout this specification reference will be made to the term "learning trial." Learning trials in the exemplary embodiment may include single instances where particular learning items are presented; multiple trials may include multiple items. Learning items may include problems, questions, concepts, procedural tasks (such as instructions to perform certain functions in learning to use a software program), and/or choices between structures, patterns, and representations. A learning trial may encompass any subject matter which may be posed in the form of a question, choice, or task to a student. In portions of the specification, reference will also be made to the term classification trial. A classification trial may be considered in the exemplary embodiment synonymous with the term learning trial. Further, the term trial may include, for example, the process of presenting a question or learning trial or classification trial to a student, wherein the student responds to the question. A trial may also include execution of a trial loop of various software modules to be described below.

Computer Hardware

Figure 1:
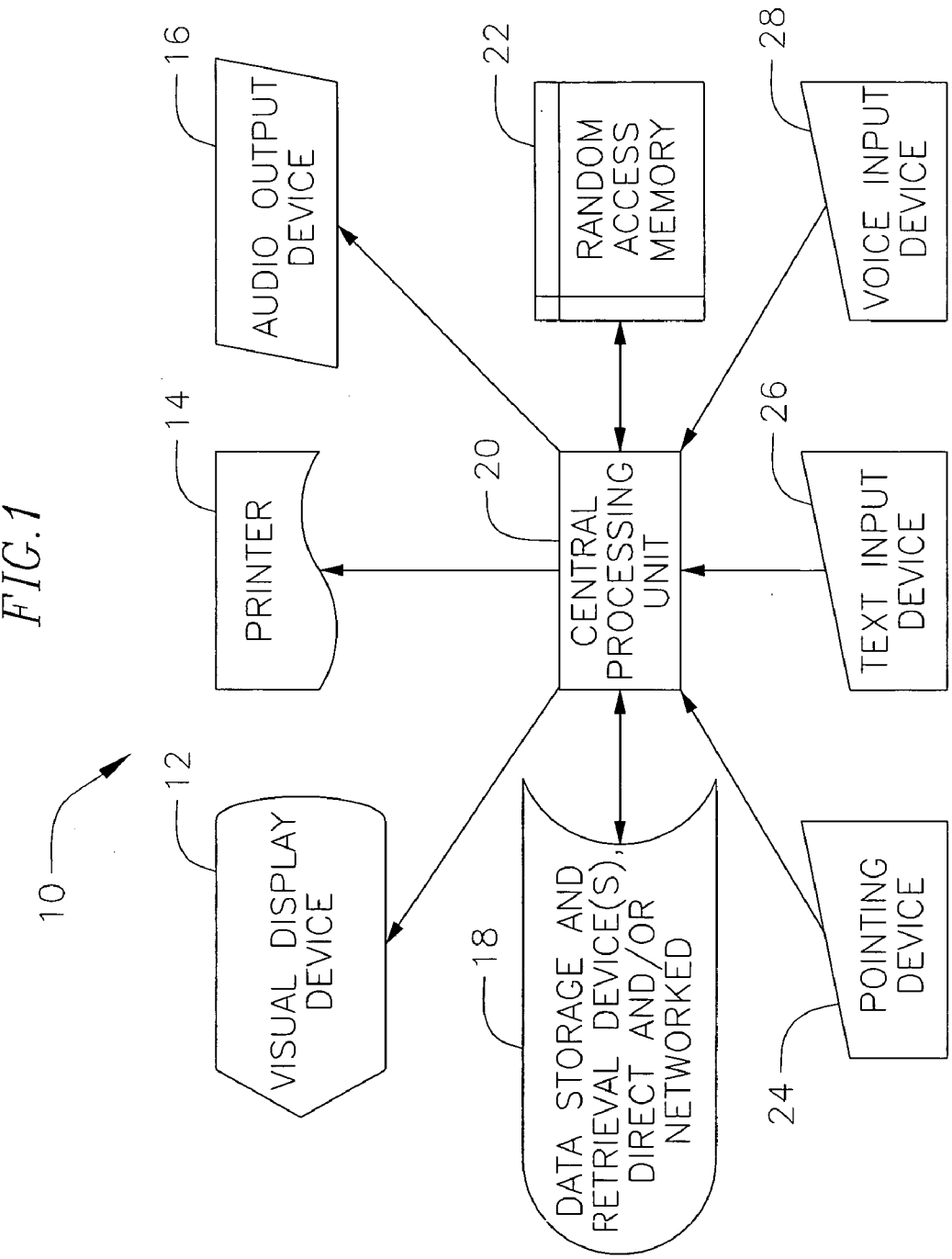
FIG. 1 is typical schematic for a computer system suitable for implementing the method of the present invention.

The ALS may be implemented on a general purpose computer ("GPC") or computer system 10 as shown in FIG. 1, or any other system known in the art, including a global computer network such as the Internet. A typical general purpose computer suitable for use with the present invention may use any one or more of numerous operating systems and microprocessors, however the system will typically be comprised of: a visual display device 12 such as a cathode ray tube, liquid crystal display or other standard display device known in the industry; a text output device such as a printer 14; an audio output device 16, such as a sound card and speakers capable of emulating spoken language; data storage and retrieval devices 18, either direct or networked such as hard drives, floppy drives, tape drives and other storage devices; a central processing unit 20 for executing the program instructions and for sending and receiving instructions to and from the peripheral devices; a random access memory 22 for ready storage and access of programs, operating system instructions and data; a pointing device 24, such as a mouse trackball, touch screen or other device for selecting optional inputs displayed on the visual display device; a text input device 26 such as a keyboard for input of responses and selection of optional choices presented by the program; a voice input device 28 such as a microphone for recording and digitizing the users voice. It is to be emphasized that the above hardware is meant to be exemplary only. Particular applications of the ALS may require more or less hardware than that described above. For example, some implementations of the ALS, particularly those requiring the learning of multi-dimensional structures, may require multiple display devices and may not require other output devices such as a printer.

The adaptive learning system and method will now be described in detail below. Based on the following description and flow charts, those skilled in the art of computer programming will be able to develop software suitable for implementing the ALS.

Sequencing Algorithm

The optimal sequencing method ("OSM") 40 in one embodiment is an adjustable, automated, adaptive procedure for sequencing a number of learning items, utilizing an optimal sequencing algorithm ("OSA") 46 to optimize learning time. The procedure can work on any set of "n" trials. Optimized learning may include such things as achieving accuracy, speed and long-term retention in the shortest possible learning time. Automated may include an implementation in which the OSM is implemented in computer code, for use on the GPC 10, to optimize learning for a given individual without human intervention, for example. In the exemplary embodiment, adaptive may encompass the OSM utilizing the individual student's speed and accuracy on particular trials, where each trial involves answering a question presented or making some forced-choice classification, to determine the sequencing of subsequent learning trials. Adjustable as applied to the OSM in this embodiment may include the situation in which the the OSA contains particular variables and constants which are identified with certain learning-relevant parameters. The variables and constants may be adjusted to tailor the OSA for optimal sequencing with respect to particular subject matter or learning domains or for individually varying learning styles.

Various embodiments of the OSM 40 embody one or more of the following features, alone or in combination, including:

1. Using speed or question response time as an indicator of learning.

Most learning technology uses only accuracy as an indicator of learning. However, in most learning contexts it is desirable to achieve not only accuracy, but fluency or automaticity, i.e., rapid and effortless processing of the subject matter. In one embodiment of the OSA, speed may be used in addition to accuracy as an indicator of fluency in the subject matter.

2. Enforcing a delay in problem recurrence.

Lasting learning may be strengthened by retrieval episodes in which relevant information must be retrieved from long-term memory. If a single problem or type of problem is given on consecutive (or nearly consecutive) learning trials, the specific answer or relevant concepts may be retrieved from short term memory, adding little to the desired learning.

3. Limiting the interval for problem recurrence.

Research indicates that the learning of new facts or concepts may be subject to decay, i.e., loss over time. Especially in the early stages of learning a new item (or concept), learning items (or problem types) must reappear within an interval that allows the next learning trial for that item or concept to build on previous learning trials.

4. Stretching the recurrence interval.

As learning of a specific item or concept improves, the question reappearance interval may in this embodiment be increased or "stretched" to optimize learning.

5. Use of many short question or classification trials.

Most conventional approaches to learning emphasize explicit presentation of facts or concepts, along with a small number of examples, worked for or by the learner. These methods have their place, but crucial aspects of human learning may be addressed in this embodiment using many short learning trials on each of which the learner classifies an item (concept or perceptual learning) or answers a question (item learning). This may be important in some cases for one or two aspects of learning: 1) perceptual or concept learning in which relevant structure that governs a category must be isolated from among irrelevant variation among instances in the category, and 2) development of efficient, automatic retrieval of a large set of memory items (e.g., basic mathematics facts, such as the multiplication tables).

6. Using an integrated learning criterion for problem retirement.

One perceived shortcoming of most conventional instruction and learning technology is that the learning does not proceed to the attainment of a clear, objective standard or criterion of learning. The learning system described here integrates learning criteria for both individual learning items (or types) as well as for whole sets of learning items. Speed and accuracy over several presentations of a learning item are used, with the particular targets (e.g., number of consecutive correct responses at or below a target response time) being instructor-adjustable. The use of integrated learning criteria interacts with the sequencing techniques to provide important advantages. Specifically, because the sequencing techniques avert the learner's use of short-term memory in achieving correct answers, and require stretched retention intervals as learning improves, attainment of the learning criteria is more indicative of real and durable learning than in other schemes.

Extremely easy and/or well-learned questions or problems do not need to reappear frequently during learning. Prior art randomizing methods for question presentation are typically insensitive to the student's speed and accuracy, thus they present questions even after they have been well learned. This wastes the student's time and runs the risk of inducing boredom which is highly detrimental to the learning process. To address this issue the OSA retires questions after a particular learning criterion is reached for the subject matter being taught. The learning criterion typically includes both speed and accuracy components that need to be met over several learning trials for a given learning item. The learning criterion is adjustable and will typically vary depending upon the subject matter being taught.

7. Scaffolding.

In many subjects or learning domains, there are some facts, items or concepts, which, if learned early, help with the learning of other more complex items or concepts. In this embodiment, the OSA allows different individual weights to be assigned to the learning items in a problem database. These weights ensure that certain learning items tend to appear earlier in learning. By ensuring that certain subject matter is learned early in the learning process, the earlier learned subject matter may serve as "scaffolding" for more advanced questions to be introduced later. This same weighting approach can generally be used to make easier questions appear in advance of harder questions.

The OSM 40 is well suited for implementation on the GPC 10 or similar systems as described above. In an exemplary embodiment for implementing the OSM, the GPC is configured to include a priority score computer ("PSC") 48 which performs calculations using the OSA 46. Those skilled in the art will understand that the PSC need not be a physical device, but preferably is a software module running on the GPC. To implement the OSM, the GPC will further include a problem database 42, a trial record database 44, and the trial loop 50. Each of these components is preferably also implemented in software running on the GPC. Shown below are Tables 1 and 2. Table 1 sets forth exemplary constants and variables used in the OSA 46. Table 2 is a mathematical representation of an exemplary OSA.

TABLE 1

EXEMPLARY TERMS FOR TILE SEQUENCING ALGORITHM
The terms specified herein are meant to be exemplary only, and therefore not necessarily r&iuired for practice of the invention:

| | |
|---|---|
| $P_i$ | Priority score for problem i. |
| $N_i$ | Delay counter, i.e., number of trials since last presentation of problem i. |
| $RT_i$ | Response-time on last trial of problem i. |
| $\alpha_i$ | Accuracy parameter<br>= 1, if response on last trial of problem i was incorrect.<br>= 0, if response on last trial of problem i was correct. |
| W | Incorrect answer priority increment. Higher values on this user adjustable parameter-lead to higher priority for quick re-appearance of incorrectly answered problems. |
| D | Minimum problem repeat interval constant. Defines the minimum number of intervening trials that must occur before a repeat presentation of a problem. |
| r | Response time spread parameter. Along with the logarithmic transformation of response times, this parameter controls the range of differences in recurrence intervals produced by short and long response times. |
| a, b | Weighting coefficients affecting the relative influence of elapsed trials since last presentation and the importance of response time in determining problem recurrence. |
| $K_i$ | Initial priority score assigned to problem i. |
| M | Number of consecutive trials of correctly answering problem i needed for problem retirement. |
| T | Target reaction time for problem retirement. Problem i is retired if it has been answered M consecutive times with response time <T. |

TABLE 2

OPTIMAL SEQUENCING ALGORITHM $$P_i = a(N_i - D)[b(1 - \alpha_i)\text{Log}(RT_i/r + 1) + \alpha_i w]$$

Figure 2:
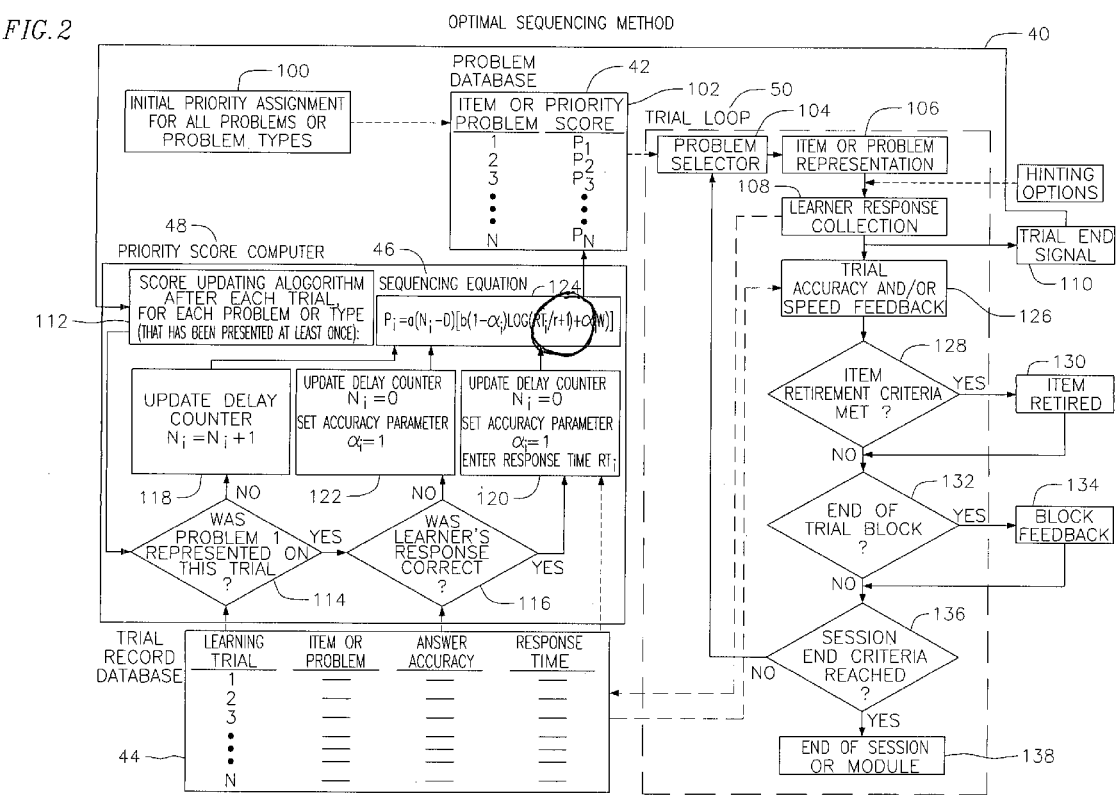
FIG. 2 is a block diagram depicting an exemplary implementation the Optimal Sequencing Algorithm of the present invention.

With reference to Tables 1 and 2, and with particular reference to FIG. 2, the operation of an exemplary embodiment of the OSM 40 will be described. The problem database contains the set of items to be learned. For item learning situations, examples would be the multiplication tables or a set of vocabulary or spelling words to be learned. For perceptual or concept learning, the problem database may be organized according to specific concepts, classifications or problem types; each type has a number of instances associated with it. When the problem type is to be used on a learning trial, an instance exemplifying that type is selected, such that specific instances used to teach the concept rarely repeat. For simplicity, we describe the sequencing algorithm for a set of specific learning items, rather than problem types, although the algorithm applies to both.

If the instructor wishes to confine the learning session to a subset of items in the problem database, a selection may be made by use of a subset utility. For example, rather than use all of the multiplication problems through 12×12, a learning set consisting only of multiples of 7 and 8 could be selected. (The subset utility is not shown in the diagram, however such algorithms are known in the art.)

In step 100, the questions in the problem database or selected subset are assigned an initial priority score ("$K_i$"). Typically, each learning item will be assigned the same initial priority value. However, if desired, the scaffolding feature of the present invention may be implemented in this step. Thus, where it is desired to present the learning items in a particular order for the first set of trials, the items may assigned-numerically increasing priorities where the learning item with the highest priority score will be the first item presented to the student. The learning item with the second highest priority score will be the second learning item presented, and so on. In step 102, the associated priority scores assigned to each learning item are stored by the OSM 40 in the problem database 42 for ready access. After the problem database is loaded, the OSM proceeds to the trial loop 50 which begins with step 104. In step 104, the OSM selects the learning item to be presented to the student. Item selection is a function of priority score with the item or problem type having the highest priority score being selected for presentation. In situations where multiple learning items have the same high priority score, the learning item is selected at random from that particular subset of items.

In step 106, the learning item is presented to the student. In step 108, the OSM 40 collects information regarding the student's answer to the learning item presented and stores this information the trial record database 44. The information collected includes the question number "i", the accuracy of the answer "$\alpha_i$," i.e. was answer correct or incorrect, and the response time "$RT_i$" of the answer. Upon completion of step 106, in step 110, the OSM generates a trial end or trial complete signal and proceeds to step 112. In step 112, upon receiving the trial end signal, the PSC 48 commences updating the priority score of each learning-problem in the problem database 42. In applications in which priority scores remain unchanged until a problem is selected and used in a learning trial, the priority score computer will update only the problems that have appeared at least once. For these problems, in step 114, the PSC queries the trial record database to determine if each learning trial in the database was presented on the last trial; if the answer is no the PSC proceeds to step 118. If the answer is yes, the PSC proceeds to step 116.

In step 116, the PSC 48 again queries the trial record database for the student's response to the learning trial. If the student's response was incorrect, the PSC proceeds to step 122. In step 122, the PSC assigns the accuracy parameter ($\alpha_i$) a value of one, and assigns the delay counter ($N_i$) a value of zero. Then, in step 124, a new priority score for the learning item $P_i$ is calculated, via the OSA 46, using the values assigned in step 122. This new priority score is stored in the problem database 42.

It will be noted that when $\alpha_i$ is assigned a value of one, the response time component of the OSA drops out of the equation and the priority score becomes primarily a factor of the incorrect answer increment factor (W). (As is typical in human performance research, response times for incorrect answers are not considered meaningful; thus, no distinction is made in the algorithm between fast and slow wrong answers.) A high value of W, relative to initial priority scores, ensures that the incorrectly answered problem will have a high priority for reoccurring shortly in the learning sequence. This priority evolves over trials under the control of the delay counter. At first, recurrence of this problem is limited by the enforced delay (D). Although reappearance of a missed problem should have high priority, it should not appear in the next trial or two, because the answer may be stored in working or short-term memory. (If the same problem is presented again while the answer is still in working memory, it will not improve learning much.) After one or two intervening trials, however, the priority for reoccurrence should be high (to build on the new learning that occurred from the error feedback after the problem was missed), and it should increase with each passing trial on which that problem has not yet reappeared. These objectives are automatically met by the algorithm as follows. Suppose D is set to 2, enforcing a delay of at least 2 trials. On the trial after the error, the trial delay counter $N_i=1$. Thus, $(N_i-D)$ is negative, and the problem has a lower priority than all other problems in the database having positive priority scores. On the following trial, $(N_i-D)=0$. For each trial after that, however, the priority score for that problem increases by $(a*N_i*W)$. If W, the priority increment for an error, is large, then the priority score rapidly increases as trials elapse until the problem is selected. This increase is modulated by the weighting coefficient "a", which governs the rate of increase in priority. Increasing "a" increases the rate of growth in priority scores for missed problems (whereas increases in weighting coefficient b increases the relative importance of slow response times). Specific examples of the evolution of priority scores, with two different parameter sets, may be found in FIGS. 3 and 4.

If the student's response was correct, the PSC proceeds to step 120. In step 120, the PSC assigns the accuracy parameter ($\alpha_i$) a value of zero, and assigns the delay counter ($N_i$) a value of one. The PSC further queries the trial record database for the student's response time (RT). Next, in step 124 a new priority score is calculated, via the OSA, using the values assigned in step 120, and is stored in the problem database 42.

In the case of correct answers, the sequencing algorithm in one embodiment preferably achieves one of more goals, the relative importance of which may be altered by parameter adjustment. Responses to individual items in item learning, or of classifications in perceptual or concept learning, needs to become not only correct but fluent. Response times indicate whether processing is relatively fluent or automatic (fast) or deliberative and weakly established (slow). The reoccurrence of learning items should differ in these cases. For weakly learned items, retesting after relatively short intervals is important for the learner to build on weak, possibly rapidly decaying, memory traces. Thus, longer response times in this embodiment should lead to higher priority score increases. The increment based on response time is weighted by the coefficient b; if b is increased for a learning application and "a" is held constant, the effect of slow response times in raising priority scores will increase relative to the effect of incorrect answers and relative to initial priority scores. Whatever the increment due to response time, it is multiplied by the trial delay counter. As with missed items, there is an enforced delay of D trials. Then the priority score will advance with each trial that elapses on which that problem was not selected for presentation.

As answers become faster and accurate, the learning goal changes. To strengthen learning and ensure its durability, the recurrence interval should lengthen as a problem becomes better learned. Maximum benefit for a learning trial is obtained if it happens at just the right time—before too much decay has occurred from the last learning trial but not too soon after the last trial. This optimal retention interval increases in this exemplary embodiment as an item becomes better learned. Whereas it may be desirable to present a newly and weakly learned item after two intervening items, it may be desirable to present a well-learned (but not yet retired) item after 10, 15 or 20 intervening items. The algorithm in this one embodiment automatically adjusts the interval for problem recurrence as response times change for all items in a learning set.

Other adjustable factors may affect how response times affect the reoccurrence interval. The sequencing equation uses the logarithmic transform of the response time RT divided by a parameter r, plus 1 ($Log(RT_i/r+1)$). The addition of the constant '1' to response times prior to logarithmic transform ensures that the logarithm never becomes negative. The use of a logarithmic transform in this embodiment reduces the effects of very large response times. That is, a difference between a problem answered in 3 seconds vs. 13 seconds is important in indicating strong or weak learning, respectively. A difference between 20 and 30 seconds, however, is not nearly as important (both are slow and suggest quick reoccurrence of the problems). Whereas there is a 10 sec RT difference in both of these examples, the $Log(RT_i+1)$ difference in the first case is 0.54 and in the second case is 0.17. The user skilled in the art will realize that any function of RT could be used in the sequencing equation. A log transform, however, will be useful in many applications for producing reoccurrence priorities that depend most heavily on important differences at the short end of the RT scale. The parameter r gives the operator of the learning system further leeway in controlling the relative importance of fast and slow responses. (The effect of r depends on the constant '1' being added to the response times; if no constant were added it would have no effect. Specifically, the effect of increasing r is to reduce the importance of RT differences in the priority scores, as the log transform depends relatively more on the constant term (1) when r increases.) In the examples above, the parameter r was 1. If it is increased to r=4, (such that the expression becomes $Log(RT_i/4+1)$), the difference for response times of 3 and 13 is 0.39 and for response times of 20 and 30 it is 0.15.

Returning to step 114, if a particular learning item was not presented on the last trial, the PSC proceeds to step 118. In step 118, for each learning item that was not presented during the previous trial, the delay counter is incremented by one (1). The PSC 48 then proceeds to step 124 and updates the priority score using the new delay counter value for each problem i and will store the updated priority score for it in the problem database 42. As mentioned above, the delay count for each problem (based on when it last appeared) increases a problem's priority on each trial, until it becomes the highest priority problem and is again selected for presentation. It does so because the delay counter $N_i$ (or more exactly $N_i-D$) serves as a multiplier of the weighted, transformed response time or the error increment (W) of a given problem (depending on whether it was last answered correctly or incorrectly). It should be noted that for each trial, the PSC in this embodiment will update the priority score for each learning item (if it has been presented at least once) even though only one question was actually presented during the trial. Thus, for each question not presented during a trial, the priority score is updated via incrementing the delay counter by a value of one. For the particular question presented during the trial, that question's priority score will be updated depending upon whether the question was correctly or incorrectly answered and upon the response time (for correct answers).

As stated, after step 110, the OSM 40 activates the PSC 48 and updates the priority score for each question in the problem database. At the completion of this operation, the method returns to step 126 of the trial loop 50. In step 126, feedback regarding the student's performance on the question presented is displayed. Student feedback may take many forms, such as display of the correct answer, the reasoning behind the correct answer, and the student's response time in answering the question. The above forms of feedback are meant to be exemplary only. The particular feedback provided will depend on the subject matter being taught. It should also be noted that in many learning situations it may not desirable to provide feedback until a particular criterion has been met. For example, feedback may not be provided until each question in a trial block has been presented at least once.

After step 126, the OSM 40 proceeds to step 128. In step 128, the OSM determines if the question presented "i" is ready for retirement. Typically, a question is retired after certain predetermined, objective criteria are met. These criteria involve speed, accuracy and consistency, they are user (teacher) adjustable prior to the learning session. After each trial involving a learning item (or concept type, in perceptual or concept learning), there is a check for problem retirement 130. If the question presented is ready for retirement, the OSM retires the question from the problem set, step 130, and returns to the trial loop at step 132. If the question is not ready for retirement, the OSM proceeds directly to step 132.

Learning sessions may be divided into groups of 10 or so trials called trial blocks. This arrangement breaks the monotony and allows for feedback and encouragement. In step 132, the OSM 40 checks to see if the end of a trial block of questions has been reached. If the answer is yes, the OSM proceeds to step 134 where feedback regarding the student's performance on the trial block is presented. Block feedback may consist of the percent correct and average response time over the previous block of 10 (or some other number) of trials. Many formats are possible, but one example of a block feedback display would be presenting two bar charts for percent correct and for average response time for the last 10 trial blocks, including the present one. This allows the learner to see progress, in terms of increasing accuracy and decreasing average response times. Other rewarding or encouraging displays or sounds can be presented at the time of block feedback.

In step 132, if the answer to the end of trial block query is no, the OSM proceeds to step 104 and the next question with the highest priority score is presented to the student. At the end of each trial block (e.g., group of 10 or 20 trials) a trial block end signal is generated and the OSM checks at step 136 whether the session is now at an end. (Step 134 is an optional step and need not be presented in which case the OSM will proceed directly to step 136.) If the session is not at an end, a new trial block is presented to the student, wherein the PSC continuously updates the problem database 42, until the learning session end signal step 138 is given. The user may also elect to stop, at the end of any trial block. A learning session may end after a predetermined length of time, number of learning trials, or after all learning items (or problem types, in perceptual or concept learning situations) have been retired. For learning of a set of items that takes longer than a single learning session, the priority scores and retirement information can be preserved, such that the learning can be resumed in a subsequent session. Additional information about continuation across learning sessions, specifically regarding problems retirement and reactivation, is given below.

Details of Exemplary Priority Score Computer. The Priority Score Computer 48 updates the priority score of questions in the Problem Database after every trial. In many applications, problems retain their initial priority scores until they are presented the first time. (Updating applies only to items that have appeared at least once, as indicated in 112.) The algorithm can be modified so that all problems' priority scores change as trials pass (as some function of the trial count parameter N), even for problems that have not yet been presented.

FIG. 3 shows an example of sequencing: a sequence of 20 trials in a learning module for basic multiplication facts. An initial priority score of 1.0 was assigned to all multiplication problems involving the integers 3 through 12 (45 unique problems, if order does not matter). Priority scores remained constant for each problem until its first presentation, after which it was updated continuously. FIG. 4 shows how priority scores for the relevant problems in the Problem Database changed over trials.

The sequence illustrates several possible exemplary features of the sequencing algorithm. First, to avoid use of short-term memory, no problem recurs without at least two other problems in between. Whether this enforced delay is at least one intervening trial or some higher number is controlled by the parameter D. In this case, an enforced delay of at least 2 intervening trials is guaranteed (D=2). Short-term or working memory lasts on the order of seconds, if information is not rehearsed or elaborated. It is also rapidly overwritten by intervening items. Second, while respecting the constraint regarding working memory, missed items need to be presented relatively soon after the last trial (in which the feedback gave the learner the correct answer) in order to maximally strengthen the new learning. In the table, the problem "6×7" is missed on trial 2 and recurs on trial 5. On trial 5, it is answered correctly, but slowly. This means that learning is occurring but is still relatively weak. Hence, the item recurs fairly soon—5 trials later, on trial 11. Another example of a correct but even slower answer appears on Trial 3; the problem recurs 7 trials later. Problems answered correctly and quickly reappear with comparatively long retention intervals (e.g., the problem "7×7" reappears on Trial 16, after being quickly and correctly answered on Trial 1.)

FIG. 5 shows a second sample sequence, from a module involving translation of words from Spanish to English. This sequence illustrates how changes in parameters can be used to vary the influence of performance factors on sequencing. In this case, parameters were changed slightly (from the previous example) to favor more rapid introduction of new problems. Specifically, the priorities for unused problems in the database were increased slightly, the weighting coefficient that modulates the effect of response times was decreased, and the priority increase connected with errors was decreased. These changes cause the recurrence intervals for problems answered incorrectly or slowly to increase somewhat, as their priorities compete less effectively with new entries from the database. For comparison, despite similar patterns of performance, the 20 trials in the multiplication example included 9 different problems; in the word translation example, the 20 trials included 13 different problems. FIG. 6 shows the priority scores for the relevant problems in the Problem Database across the 20 trials.

Details of the Learning Criterion.

An example of Problem Retirement Criteria is shown in Table 3 below. A sequence of trials for a single learning item is shown, along with accuracy and speed. The criterion for this example is correct answers with response times less than 5 sec on three consecutive presentations of the problem. In accordance with the sequencing algorithm, the problem recurs at intervals in the learning session that depend on its speed and accuracy.

TABLE 3

| Session Trial # | Accuracy | Response Time (sec) | Comment |
| --- | --- | --- | --- |
| 1 | Incorrect | — | Error does not contribute to problem retirement |
| 4 | Correct | 4.5 | Counts as one trial toward Retirement |
| 16 | Incorrect | — | Error resets retirement trial Count |
| 21 | Correct | 3.5 | Counts as one trial toward Retirement |
| 36 | Correct | 4.7 | Counts as second trial toward retirement |
| 53 | Correct | 8.6 | Slow response resets retirement trial count |
| 59 | Correct | 4.4 | Counts as first trial toward Retirement |
| 73 | Correct | 3.7 | Counts as second trial toward retirement |
| 103 | Correct | 3.3 | Counts as third trial toward retirement; Item RETIRED |

The learning criterion at step 130 (FIG. 2) is chosen to meet learning goals of the strength, durability and automaticity of learning, by means of speed and accuracy. An example of a learning criterion would be that for each problem, the learner responds on three consecutive presentations of that problem with a response time under 5 seconds. ("Consecutive" here refers to presentations of that particular item, whenever these occur; because of the sequencing algorithm, these will not be consecutive trials in the learning session.) Table 3 shows an example of the problem retirement criteria applied to a series of user responses on a learning item.

An additional feature in this embodiment related to problem retirement is an instructor-adjustable parameter for governing problem retirement when the learning of a set of items takes place in multiple sessions separated by breaks or gaps. For example, suppose a learner is working on the multiplication tables and retires several problems in a learning session but does not complete the whole set. If the learner returns a day later, several options are possible. The program can simply maintain the retirement and priority score information from the prior session and resume learning as if no inter-session gap had occurred. In many cases, a second option is preferable. Previously retired items can be reactivated, such that they are reset to be, for example, one trial away from retirement. In this case, the database would list these problems so that they could appear in the trial sequence. If such a problem is correctly answered within the target response time on one new presentation, it would then be retired. If, however, the problem was not correctly answered within the target response time, it would remain active in the problem database. (One error or failure to meet the target response time would reassert the original retirement criteria, e.g., three new consecutive successes on the problem to achieve retirement.) This scheme allows for review and re-checking of learning from an earlier session. Items whose learning has persisted will be rapidly "re-retired" whereas those items that have been forgotten, or have become less automatic, will be reinstated into the set of active learning problems.

Perceptual Learning Modules ("PLMs")

Perceptual learning refers to experience-induced changes in the way information is extracted. Research indicates that experts in a particular domain differ remarkably from novices in their ability to detect both details and complex relationships that determine important classifications. Experts process patterns more efficiently, selecting relevant and suppressing irrelevant information. Moreover, expert information extraction often shows automaticity, the ability to process information with little or no effort, and little interference with some other task performed concurrently.

These differences in information extraction may be found in any domain in which participants have had long experience. What the expert mathematician, aircraft pilot, chemist, radiologist and chess player all have in common is the efficient pick up of relevant features and relationships. Such abilities are in large part specific to the domain, which is why becoming a grandmaster at chess does not make it much easier to master instrument flying or radiology. We refer to these learned abilities in particular domains using the largely interchangeable terms perceptual learning or structure learning. This form of learning is extremely important but largely neglected in most instructional settings.

The primary reason for this neglect may be the lack of appropriate techniques for producing perceptual learning. Research in cognitive science and psychology has documented the differences between novices and experts but has not made clear instructional techniques that can systematically and rapidly produce perceptual learning in educational settings or in educational technology. There have been a few efforts to train basic sensory discriminations, such as the skill of telling apart speech sounds. In areas of more complex cognitive expertise, such as science and mathematics learning, where abstract, symbolic and and/or visuospatial material are often crucial, techniques have not been available to accelerate the learning of relevant structures. A related problem is that emphasis in conventional instruction, including most computer based technology, is on verbalizable information (declarative knowledge), rather than pattern recognition. Evidence suggests that perceptual or structure learning engages unconscious pattern processing systems, leading to learning that is often not verbalizable. In short, conventional educational and commercial instructional settings do not directly produce, accelerate or measure perceptual learning. It is usually believed that the expert's pattern processing skills must come from long years of experience, rather than from an instructional technique.

The learning techniques described in this embodiment preferably directly address perceptual or structure learning implemented in computer-based technology. They interact with and complement the sequencing techniques described earlier. The perceptual learning techniques support rapid acquisition of complex classifications, including those based on visuospatial structures and those that require mappings across multiple forms of representation. These are common to many learning situations in science, mathematics, medicine, aviation and many kinds of commercial training. We distinguish two exemplary variants of our procedures: Structure discovery and structure mapping. Although there are some differences, the appropriate kinds of learning experiences in this particular embodiment both involve large numbers of short, systematically organized classification trials, arranged to allow discovery of diagnostic information required for a complex classification.

Structure discovery refers to the development of a student's ability to find the crucial information that distinguishes members of a category from non-members, or to find a pattern that allows accurate classification of new instances into the correct one of several competing categories. An example would be classifying an individual bird as a member of one of several species of birds. Another example would be seeing that a certain algebraic expression can be transformed into a different looking, but equivalent, expression. With the proper techniques, learners become able not only to extract the relevant structure but make classifications effortlessly and intuitively, i.e., with automaticity. It is crucial to note in this embodiment that structure discovery in our usage typically involves acquiring information that will allow classification of new instances of a category. It is not the learning of particular instances, such as the sound of a particular phoneme or the correct species label for a particular photograph of a bird.

Learning of structure in high-level domains is difficult because the domains involve complex, multidimensional stimuli. A crucial classification—whether an instance is one kind of thing or another—depends on certain information, i.e., the features or relationships that characterize members of some category. The information that is relevant for a particular classification may be referred to as diagnostic structure or invariant structure. (Diagnostic structure is a more inclusive term, as the notion of invariant structure—something every instance of the category has in common—may be too strong for categories defined by a family of features or relationships.) The learning problem is the extraction of diagnostic structure from amidst irrelevant information. An example would be the visual patterns that signal a certain type of pathology on a mammogram to the expert radiologist. Each mammogram containing detectable pathology of this type will have one or more visual features characteristic of such pathology. At the same time, any such mammogram will also have numerous irrelevant features—aspects that are not related to the classification as pathological. In a specific case, the pathology may occur in the left or right breast, in the upper left quadrant of one breast, and it may be of a certain size and orientation. These features are important for treatment in that particular case, but they are not features used to diagnose pathology. In other words, for the radiologist's next case, it would be silly to look for pathology only in the same breast and the same location or to look for pathology that had the same size and orientation as the prior case. Diagnosing pathology, then, requires learning to locate certain diagnostic structures across possible variation in location, size, orientation, etc. Developing skills to distinguish diagnostic structure from irrelevant variation is a primary goal of perceptual learning.

Another example of structure discovery in practice is the ability of an air traffic controller to recognize at a glance that two aircraft are on a collision course (the diagnostic structure) and when they are not. A flight controller's display typically represents aircraft as two-dimensional vectors with an accompanying scalar indicator of altitude. It is critical that controllers rapidly and accurately discriminate between those relationships among aircraft that represent collision courses and those that do not. Collision relationships (the diagnostic or invariant structure) may of course occur in any part of the depicted airspace, in any orientation on the display screen, at any altitude, etc. (the irrelevant variation). Learning to extract these relations automatically with conventional methods requires extended practice on the order of years.

In contrast to structure discovery, structure mapping typically requires learners not only to discover structure, but to map it (translate it) to the same structure conveyed in a different representation. For example, the functional relationship between two variables in mathematics may be given in terms of an equation (algebraic representation), as a graph (geometric representation) or as a description in words (natural language representation). Another example would be the relation between a formula for chemical structure of a molecule and a 3-D visual representation of the molecule. Many important, high-level learning tasks require learners to map diagnostic structures across multiple representations. Both structure discovery and structure mapping may taught for a variety of learning domains through the use of the automated Perceptual Learning Modules, or PLMs, of the present invention.

Both structure discovery and structure mapping typically require techniques that engage a filtering process. The process can be realized via a structured set of classification responses by the learner. To succeed, it must include sufficient numbers of discrete trials and specially designed display sets that allow extraction of diagnostic structure while also allowing decorrelation of irrelevant information. Typically, a PLM consists of a sequence of short, forced-choice, speeded classification trials, where both the student's reaction time and accuracy are assessed. The PLM must include a database containing a large number of displays, often, but not limited to, visuospatial displays, along with appropriate categorization information. Typically, the PLM will present students with a series of classification trials where the student makes a categorization response. Feedback about speed and accuracy is displayed after each trial, and block feedback is given after blocks of about 10 or 20 trials.

A PLM in accordance with the present invention may incorporate one or more of several features relating to perceptual learning. These features may include, for example, the following:

1) Systematic Variation of Irrelevant Features in Positive and Negative Instances.

In this embodiment the diagnostic structure or mapping is presented to the student across many classification trials that contain irrelevant variation. In the limit, any features that may vary among instances of a category, yet are not diagnostic of the category, should be varied. (In practice, variation of a smaller set of salient but irrelevant features may suffice for structure learning.) For example, suppose one wanted learners to be able to quickly and easily distinguish members of one breed of dogs, e.g., Scottish Terrier, from among others that look very similar to untrained observers (e.g., Welsh Terrier, Wheaten Terrier, Australian Terrier, etc.). In a perceptual learning module, although a verbal description of relevant characteristics may be included at the start, the important activity would occur across a series of rapid classification trials, in which many different examples, both in and out of the category "Scottish Terrier," would be presented. In a simple version, on each trial, a picture would be presented and the learner would make a forced choice "yes" or "no" judgment of whether the picture depicts a Scottish Terrier. In a PLM devoted to learning just this category, perhaps half of the trials would contain Scottish Terriers and half would not. (Of course, a more complicated version could involve the learning of multiple breeds concurrently.)

Two types of systematic variation are typically included in this system. Across learning trials, irrelevant features of positive instances (in this case, Scottish Terriers) must vary. Accordingly, a specific picture of a dog would be seldom if ever repeated in the learning sequence. Positive instances of Scottish Terriers would vary in size, weight, age, specific coloration, camera angle, etc. that are not relevant to the diagnostic structure of being a Scottish Terrier. The second type of systematic variation that must be arranged in the display set involves negative instances (in this case, examples that are not Scottish Terriers)). Across trials, negative instances would vary along many dimensions, just as positive instances. However, for best learning, they should also share the values of positive instances on these irrelevant dimensions. Thus, if some pictures show Scottish Terriers that are young, fat, or have a random marking on one shoulder, then some negative instances (pictures that do not depict Scottish Terriers) should include instances that are young, fat, and that have a random marking on one shoulder. On these dimensions, which are not diagnostic structures for the category "Scottish Terrier," the positive and negative instances in the display set should be arranged to have as much similarity and overlap as possible.

The two types of systematic variation preferably allow the diagnostic structures to be extracted by pattern learning mechanisms from among incidental variation and irrelevant attributes. This feature may be helpful for producing learning about important general pattern structure rather than memorization of particular instances. Also, it is the learning of diagnostic pattern structures that holds the key to the elusive problem of transfer: getting the learner to generalize the classification or concept to new instances.

2) Large Display Set - Few Instance Repetitions.

For each problem type in this embodiment there are preferably large set of different instances, all embodying the concept, structure, or classification to be learned. In contrast to many learning formats, in a perceptual learning module there must be little or no repetition of specific instances. The reason is that learners will learn to associate the correct answers with particular instances rather than learn the diagnostic structures that govern classification of all instances. Earlier, in describing the optimal sequencing algorithm, we often used examples in which specific items repeated, such as an item from the multiplication tables. Item memorization is an important kind of learning. Here, however, it is important to realize that perceptual or structure learning differs from item memorization. (Accordingly, the application of sequencing to perceptual learning involves the sequencing of problem or concept types, rather than sequencing of specific instances.)

For an example involving structure mapping, suppose one is learning how the graphs of functions change in appearance when a function of the form $y=f(x)$ is changed so that $y=f(-x)$. (This transformation produces a reflection of the graph around the y axis.) The goal of instruction in this embodiment is not to have the learner memorize specifically the shapes of the graphs of a particular instance (e.g., $y=\operatorname{Sin}(x)$ and $y=\operatorname{Sin}(-x)$), but to intuit the graphical consequences of the transformation on any function, including new examples to be encountered in the future. The specific instances for this problem type must change over learning trials to facilitate the learning of the transformation.

3) Short Speeded Classification Trials.

Structure discovery and/or mapping processes advance when the learner applies attention to a complex display and seeks to isolate the relevant dimensions or features that determine some classification. Becoming a selective and fluent processor of structure appears to typically require extensive classification experience. Three obstacles of conventional instruction are understandable in light of this idea. One is that presenting one or two examples (or homework problems) often proves inadequate to produce learning of important concepts. A second is that the desired learning in many domains appears to require long years of experience and is considered out of reach for explicit teaching. The third is that learners in conventional settings often fail to transfer to the same concept, idea or structure when it appears in a new context.

These limitations may be overcome by perceptual learning methods. Over many classification experiences, through mechanisms not yet fully understood, human attentional processes ferret out the relevant information from among irrelevant attributes of the instances. This filtering process occurs in natural learning situations, such as discovering what appearances of the sky predict an impending storm. Perceptual learning methods condense these classification experiences to accelerate structure learning. Instruction is organized around many short, speeded classification trials, during which the displays vary to facilitate learning of diagnostic structures. In most applications, feedback about the accuracy of the classification after each trial is important in leading attentional processes to isolate the relevant information.

4) Continuous Speed and Accuracy Monitoring

Objective performance data, including both speed and accuracy, are used in this embodiment for ongoing assessment of learning, sequencing (using the sequencing technique described above) and in setting learning criteria. Accuracy data alone do not adequately determine whether the learner has achieved structural intuitions and automaticity. Speed data are used to distinguish between slow, deliberative processes and the desired fluent and intuitive use of information. Accordingly, in most applications, classification trials are continued after accurate performance has been attained in order to establish fluency. Speed and accuracy criteria are applied to each particular concept in the learning module.

5) Requirement for Structure Search or Comparison.

Although perceptual learning modules may be preceded by, or be interspersed with, verbal and/or written instruction, preferably, such declarative presentation of material is kept to a minimum during training. In this embodiment, individual trials pose classification problems (in formats described below) that require the student to visually search out relevant features in a display, or compare multiple displays, before receiving feedback.

6) Feedback for Classification rather than Content

In most PLM applications, accuracy and speed feedback is given after each trial. PLM feedback indicates the correct response, and may show some display for comparison. Note that this exemplary form of feedback in PLMs does not explicitly indicate the basis for the correct answer. For example, if a chemistry learner is viewing a model of a molecule, and must make a forced choice of whether its structure places it in a certain chemical family, the feedback would indicate whether the responder's yes/no choice was correct. Feedback in this case would not describe the aspects of the molecule that determine the correct answer. The reasons for this difference from many conventional instructional formats are twofold. First, the unconscious or implicit structure discovery process will operate on its own to discover the structural invariants given appropriate classification examples and enough of them. This discovery process may actually be hampered or slowed by the interweaving of too much explicit, declarative information. (The point is not fully general, In some cases, interweaving of explicit information may be useful, and is still consistent with the present invention, but in many contexts adding explicit content feedback is unnecessary or even detrimental.) The second reason for usually omitting content feedback highlights an important feature of perceptual learning systems. It is that perceptual learning systems, unlike most other learning systems, can be applied to domains in which the structural invariants are unknown. Suppose we want to train a pharmaceutical chemist to recognize which chemical compounds will block a certain receptor site on a molecule. Assume we know the blocking effectiveness for a large group of molecules, but that the particular aspects of structure in these complex compounds that leads to the blocking effect is unknown. How can we teach a chemist to distinguish good blockers from ineffective ones? This can be done with perceptual learning methods. If the outcome data (in this case, the blocking efficacy) is known for each molecule, the module might work as follows. On each trial, a molecular model of one compound appears, and the learner makes a forced choice of whether it is an effective blocker or not. Feedback simply indicates whether the correct answer is "yes" or "no." Over many such trials, using a large set of compounds including both good and poor blockers, the learner may come to extract the relevant structural features that distinguish good blockers and may become able to accurately classify new instances. These attainments can occur despite the fact that the particular structural invariants involved are unknown, both prior to the training and afterwards. (The learner may become able to do the task but be unable to articulate the relevant structure.) This property of perceptual learning systems—that they can operate using feedback on classification accuracy, without specific content feedback—may be important in this one particular embodiment because much of high level human information extraction, as in chess and radiology, is not readily accessible to consciousness.

7) Classification Task Options to Optimize Learning.

At the heart of a PLM according to one embodiment is a classification task, an instance of which appears on each learning trial, that engages the filtering processes involved in structure learning. A number of classification task formats may be used in the present invention. Choice among these formats gives flexibility in accommodating different learning domains and in optimizing learning. Two useful task formats are, for example, pattern classification and pattern comparison; these can be used individually or may be mixed within a learning session. These two types of task options (and others) can be used in both structure discovery and structure mapping versions of PLMs. For simplicity, the task options are explained below using examples in which there are complex displays that the student needs to learn to categorize and some relatively simple labels or categorization responses to apply (i.e., structure discovery). In actual practice, learning tasks may often require mapping between two differing representations of patterns/structures (structure mapping). The latter can still utilize pattern classification ("Yes or no: This structure in representational format #1 is a match to this structure shown in representational format #2.") or pattern comparison ("Which of these two (or more) structures shown in representational format #1 is a match to this structure shown in representational format #2?").

8) Contrastive Feedback.

Although we noted above that specific content feedback (explicitly explaining the reason for the correct classification on a trial) is seldom used in PLMs in one embodiment, particular feedback that continues the learner's search for important structure may be useful in another embodiment. Contrastive feedback is an example of feedback that may aid in the implicit filtering process that produces perceptual learning. It is applicable to PLMs that include the learning of transformations. In contrastive feedback, a transformed object, used in the just-finished learning trial, is shown next to or overlaid on a basic or canonical (untransformed) object.

Example: In a PLM for learning mathematical transformations in equations and, graphs, each individual classification trial may present a graph and require the student to make a speeded, forced-choice classification from among several equations (as to which shows the same function as the graph). On a particular trial, the student might be presented with the graph of y=Sin (−3x) and have to choose from several equations which matches the graph of y=Sin (−3x). After making his/her choice, the student receives feedback indicating whether it was correct and displaying the equation chosen along with the graph of y=Sin (−3x). The contrastive feedback consists of an additional overlay on the graph showing the basic function y=Sin x, perhaps indicated as a dotted line. The contrastive feedback consists of the pairing in the same display of the transformed example and a basic untransformed one, highlighting the transformations. In this case, scrutiny of the contrastive feedback may help the learner to extract the particular transformations involved with negation within the scope of the function and with changing the frequency (by means of the coefficient 3). The elements of PLMs can easily be instantiated in a variety of learning modules for aviation, air traffic control, science, and mathematics. They also apply readily to a variety of professional and commercial training contexts such as radiology and power plant operation. In Table 4 below, a number of examples of the types of learning to which PLMs are well suited are defined by way of brief examples. It is to be emphasized that Table 4, is meant to be exemplary of only a few of the learning domains to which PLMs may be applied.

TABLE 4

EXAMPLES OF LEARNING

Learning a classification includes learning the details, dimensions or relations that distinguish one category from another. Examples might include in radiological diagnosis, sorting mammograms into normal or pathological; in botany, distinguishing varieties of maple leaves from varieties of oak leaves; in art, distinguishing Picasso's brush strokes from Renoir's, or distinguishing Renoir's brush strokes from those of a Renoir-forger.
Learning abstract or higher-order structures or relations refers to classification based on relationships that are quantified over variables, or put more simply, that are not tied to their concrete particulars. For example, learning what a rectangle is requires learning relations between sides of a shape, no matter what the lengths of the sides may be or how they are conveyed (e.g., given by lines drawn on paper or by lines comprised of members of a marching band). Many important applications of PLMs involve abstract structures, including most in mathematics and science.
Learning transformations includes learning the effects of certain changes on structures and patterns. In mathematics, this includes learning relations between graphs of a function f(x) and transformations such as f(−x), −f(x), f(nx), n(f(x)), f(x + n), f(x − n), etc. Other examples are algebraic transformations that produce equivalent expressions (e.g., through the distributive property).
Learning notation would include learning to comprehend and fluently process the characteristic representations used in a domain, e.g., the various kinds of lines, letters and symbols used to depict the structure of molecules in chemistry.
Learning a mapping involves recognizing a common structure expressed in different representational formats. In mathematics, for example, a single TABLE 4-continued

EXAMPLES OF LEARNING set of relationships can be expressed as an equation, a graph or a word problem. In chemistry, the same structure can be given as a 3-D molecular model or in chemical notation on a page. Learning a translation is essentially the same. For example, in mapping words, phrases or expressions in a new language, one is learning a mapping onto one's own language.
Learning a <u>concept</u> may include and refers to any of the above (e.g., learning of classifications, structures, relations, transformations, mappings or notations).

As stated above, in implementing a PLM in accordance with the present invention, one or more types of learning trials to enhance pattern recognition/discrimination skills may be used. Examples of these are "pattern classification" and "pattern comparison."These methods are described below.

Pattern Classification Task.

On each learning trial, the student indicates that the display presented (e.g., a visual or auditory display) is or is not in a certain category, does or does not have a certain property, or fits one of several descriptive options given as a list. Pattern classification responses may be best for initial learning of complex material, or where it is impractical to show multiple displays or alternatives as the response options.

Example: In an air traffic control module, the student views a visual display of air traffic and categorizes as quickly as possible whether there is or is not a positional conflict among any aircraft in that display.

Example: In a chemistry module, a bond angle is highlighted on a CRT display of a rotating 3-D, molecular model, and the student must indicate which of several choices for the bond angle describes the viewed molecule.

Pattern Comparison Task

For pattern comparison, rather than indicate whether or not a presented item has some property or fits in some category, the student is given two (or more) displays and required to make a speeded, forced choice of which of the two has the designated property or fits in the category. Using the pattern comparison task on some or all learning trials facilitates attentional search between a positive and negative instance of a category with minimal demands on memory. In single pattern classification, the learner's filtering process must preserve information across trials, making the storage of relevant pattern details and relationships important. In pattern comparison, the simultaneous presence of a positive and negative instance may allow the student to more rapidly discover relevant details, features and/or relations that determine the classification or concept under study.

Example: In a chemistry module for learning about constraints on molecular structure (e.g., possible bond angles and numbers) on each trial, two similar molecular structures (one of which contains a violation of bonding rules) are shown and the student must make a speeded, forced choice response indicating which one is a possible molecule (where possible means it could actually occur in nature).

Example: In a module on mapping graphs and equations, on each trial, the student may be shown a symbolic expression for a function and must make a speeded, forced choice deciding which of two graphs matches the function.

Figure 7:
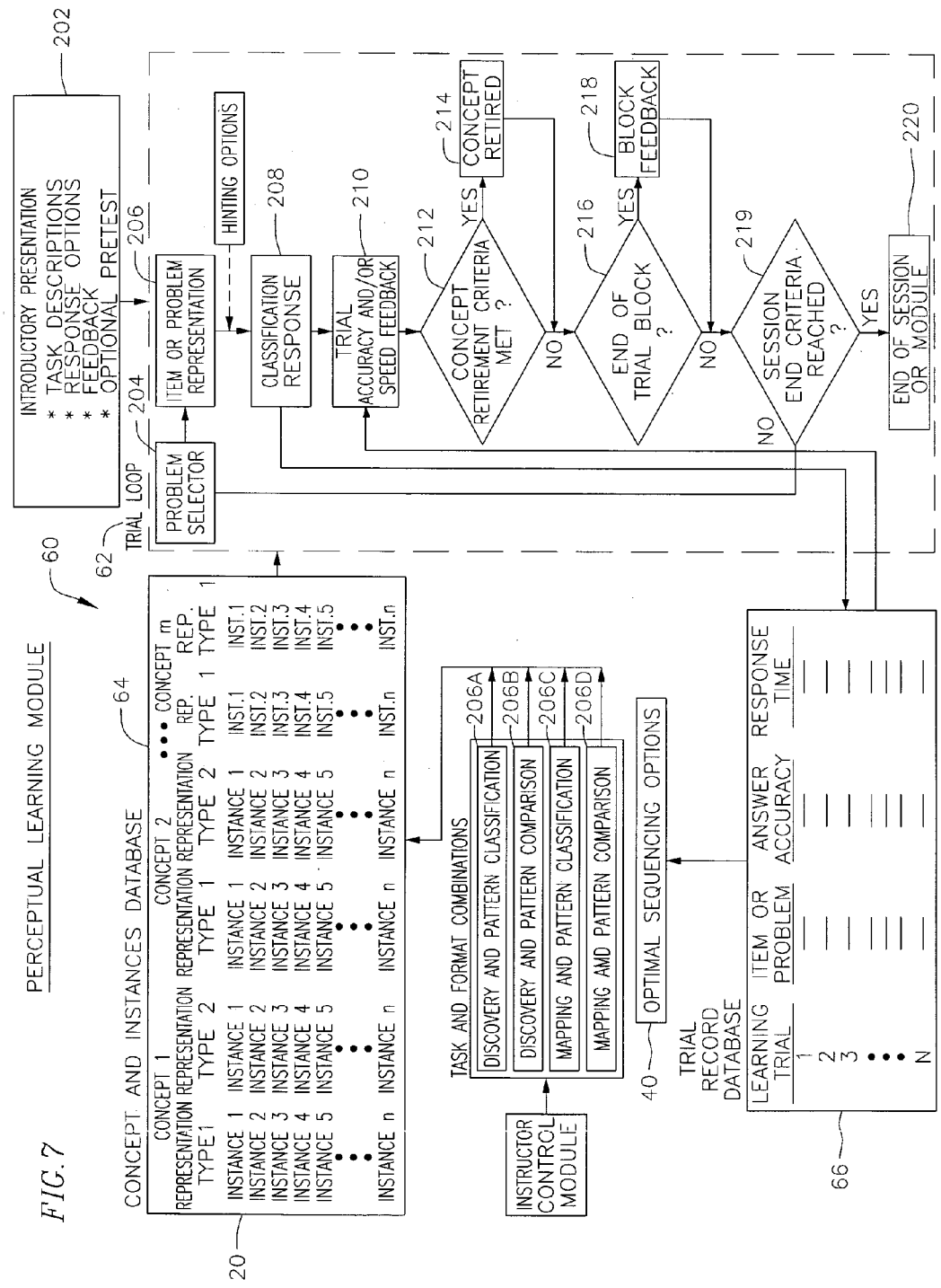
FIG. 7 is a block diagram depicting an exemplary embodiment of a Perceptual Learning Module in accordance with the present invention.

Referring now to FIG. 7, a block diagram of a of a perceptual learning module ("PLM") 60 is shown. Preferably, the PLM 60 is a software module running on the GPC 10. In the exemplary embodiment, the PLM features a trial loop 62, a concepts and instances database 64, a trial record database 66, and optionally may feature an OSM module 40. In step 200, for the subject matter desired to be taught, a set of concepts is placed in the concepts and instances database. For each concept, there are a number of instances that share the diagnostic structures for that concept, but differ from each other on attributes that are incidental for learning the diagnostic structure. In a module for learning about styles of painting, one concept might be "Impressionist" and each instance might be a particular sample (e.g., a painting). When the structure mapping variant is used, the database is similarly loaded with concepts, but each instance of each concept appears in two or more different representational forms (labeled Representation Type I and Representation Type II in FIG. 7). For example, in a chemistry module teaching families of molecules having related chemical structures, each chemical family would be a concept to be learned. An instance of a concept would be a particular molecule in that family. Representation Type I for each instance might be the diagram of that molecule in chemical notation. Representation Type II might be a rotating, 3-D molecular model of the molecule. Typically, concept includes a number of instances in each of several different representational formats. For each target representation, the associated alternative representations may or may not include the same invariant structure as the target. In step 202, a student beginning the PLM first receives an introductory presentation describing the kind of classification task to be performed on each trial. The introductory presentation may further include a pre-test of student performance on the relevant concepts or classifications, in a form similar to the classification trials or in some other form. Feedback regarding the student's performance on the pre-test may optionally be provided. Based on the student's performance during the pre-test, the feedback information may include helpful hints optimizing the students learning experience while using the PLM.

After the introductory presentation, the PLM 60 proceeds to step 204 where a problem is selected for presentation to the student. Preferably, problems are selected according to the OSM 40 described in the section on optimal sequencing. However, though desirable, the OSM is not a required component of the PLM. If the OSM is not present or is not enabled, typically problems will be selected randomly from the categories database 64. In step 206, the PLM determines whether the classification trial is one of the following formats: 1) a structure discovery trial requiring a pattern classification response, step 206A; 2) a structure discovery trial requiring a pattern comparison response; step 206B; 3) a structure mapping trial requiring a pattern classification response, step 206C; or 4) a structure mapping trial requiring a pattern comparison response; step 206D. The use of different formats is instructor configurable, via the instructor control module 203.

The choice of structure discovery vs. structure mapping is often dictated by the material to be learned (e.g., whether it involves learning a mapping across multiple representations of each concept). The other choice—whether individual trials should follow the pattern classification or pattern comparison formats—can be decided in the set-up of the module by the instructor. One format or the other may be selected, or, random selection or alternation between the two formats may be selected.

After step 206A, B, C, or D, the PLM proceeds to step 208. In step 208, categorization response data for each trial is collected and stored in the trial record database 66. In step 210, the categorization response data collected in step 208 is used to provide feedback to the student. Note that when optimal sequencing is used with the PLM, the categorization response data will then also be used by the optional OSM 40. Proceeding to step 212, the PLM checks to see if a learning criterion has been met for the preceding concept. (Typically, the learning criterion comprises a predetermined number of trials of instances of a particular concept, where for that concept, the correct answer has been given over several consecutive encounters with that concept, at or below some target response speed.) If the answer is yes, the learning criterion has been met, the particular concept is retired, step 214, and the PLM proceeds to step 216. If the answer is no, then the concept remains active in learning session and the PLM proceeds to step, 216. In step 216, the PLM checks to see if the end of the trial block 68 has been reached. If the answer in step 216 is no, the PLM proceeds to step 204 and a new learning item is selected and presented to the student. If the answer is yes, the PLM provides block feedback, step 218. Blocks of trials continue in this manner until some end of session, step 220, criterion is met. The session ends when all concepts are retired, or when a predetermined (instructor configurable) number of trials have occurred or a present amount of time has elapsed.

When a learning session ends based on elapsed time or number of trials, or when a session is terminated by a student prior to official session end, some problem types may have not yet been retired. A resumption feature can be used in such cases. The student's performance data are stored such that upon logging in at some future time, the learning session can resume. In the new learning session, problem types that have not yet been retired will be presented. The instructor may also select a modified resumption option, in which previously retired problem types appear once for review. If such a problem type is answered correctly and within a target response time in the resumed session, it will be re-retired, as the student's performance indicates that learning has been retained. If the previously retired problem type is answered incorrectly or slowly, it becomes part of the active problem types, sequenced according to performance (if the OSM is in use). For such a problem, the full retirement criterion (e.g., n consecutive encounters answered accurately within the target response time) will be required to retire the problem.

Figure 8:
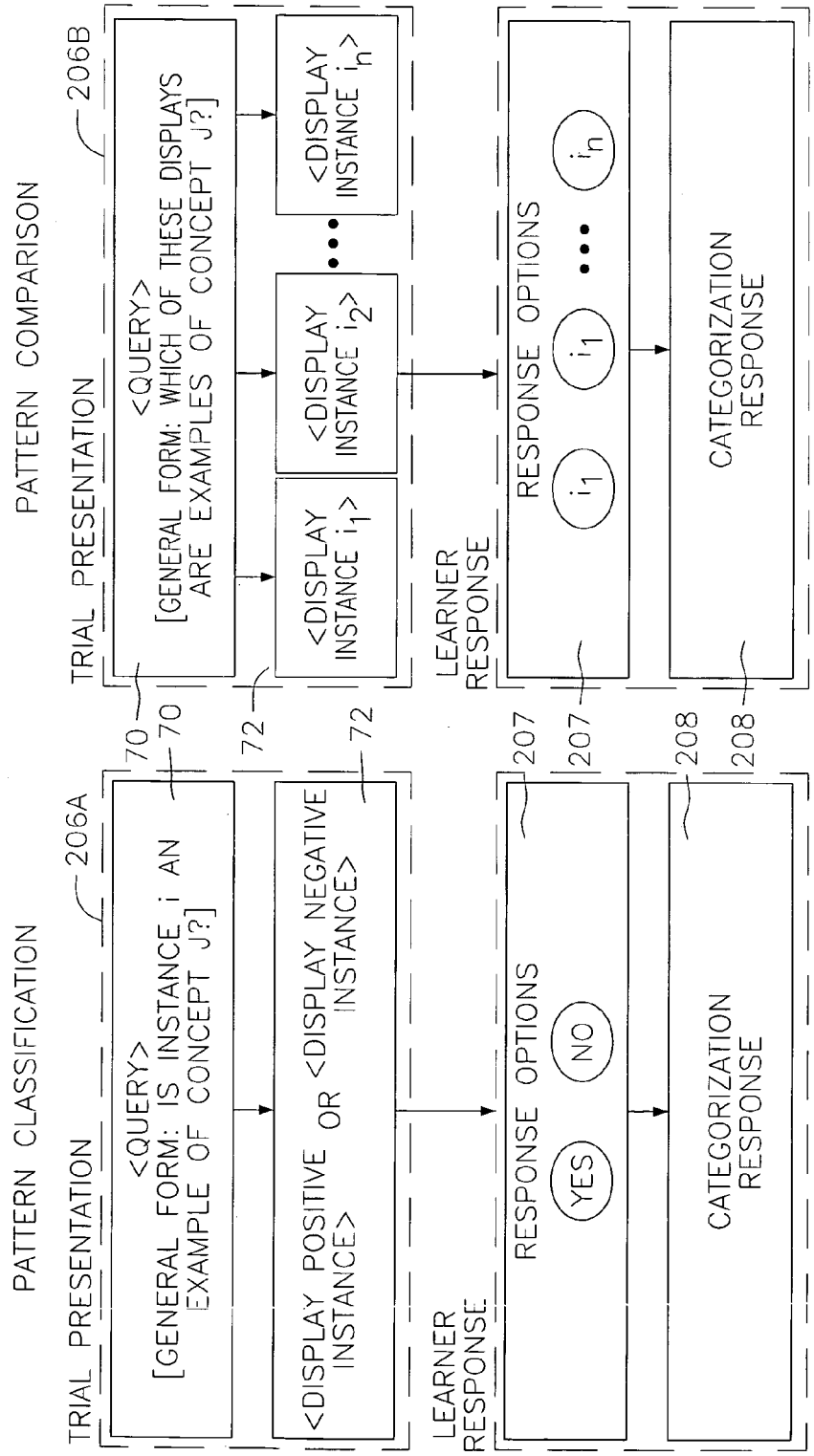
FIG. 8 is a block diagram depicting the pattern recognition and pattern classification features of an exemplary Structure Discovery variant of a Perceptual Learning Module.

Referring now to FIG. 8, and moving back to step 206, if the PLM determines that the classification trial is a structure discovery trial that requires a pattern classification response, the PLM will proceed to step 206A. In step 206A, the PLM presents the student with the concept or query regarding the concept 70 and then presents a display 72. The student then indicates whether this display is or is not an instance of the concept, step 207. Next, the PLM proceeds to step 208 as shown in FIG. 7.

In this embodiment the target concept is referred to in a query or classification problem that will apply to the display that follows in 72. This query or task assignment can have many forms. An example in a chemical structure module would be a simple frame of text saying "In the next frame, you will see a rotating, 3-D representation of a molecule. You are to decide, as accurately and quickly as possible, whether its structure is possible or impossible according to the laws of chemistry. If it is possible, use the mouse to click the button that says 'Possible' on the screen. If it is impossible, click the button that says 'Impossible' on the screen." Where the same query is used over a sequence of trials, the query screen 70 may be dispensed with, as the student will know the task. In other applications, the specific queries or classification tasks may vary over trials, in which case some indication must be given as to what classification is to be made on a given trial. The concept query and the task assignment may also be combined with the actual display presentation step 72.

With continued reference to FIG. 8, if in step 206 the PLM determines that the classification trial is a structure discovery trial that requires a pattern comparison response, the PLM will proceed to step 206B. In step 206B, the PLM presents the student with the target concept 70 and then presents the student with a plurality of displays 72. The student must then indicate which of the plurality of subsequent displays is an instance of the concept, step 207. After the student responds, the PLM proceeds to step 208 as shown in FIG. 7.

When the concept query 70 is in the pattern comparison format, the query will generally be of the form "Select the pattern that fits in Category J." Continuing the example used above for pattern classification, the query or task might be "In the next frame you will be shown several rotating, 3-D molecules. Only one has a chemical structure that is possible according to the laws of chemistry. Choose the possible molecule." Here again, the query screen may be needed only at the start of the module to indicate explicitly the task. Later, because the student will see large numbers of trials in the same format, the instructions may not require a separate query screen; the response options accompanying the actual display presentation may be self-explanatory.

Figure 9:
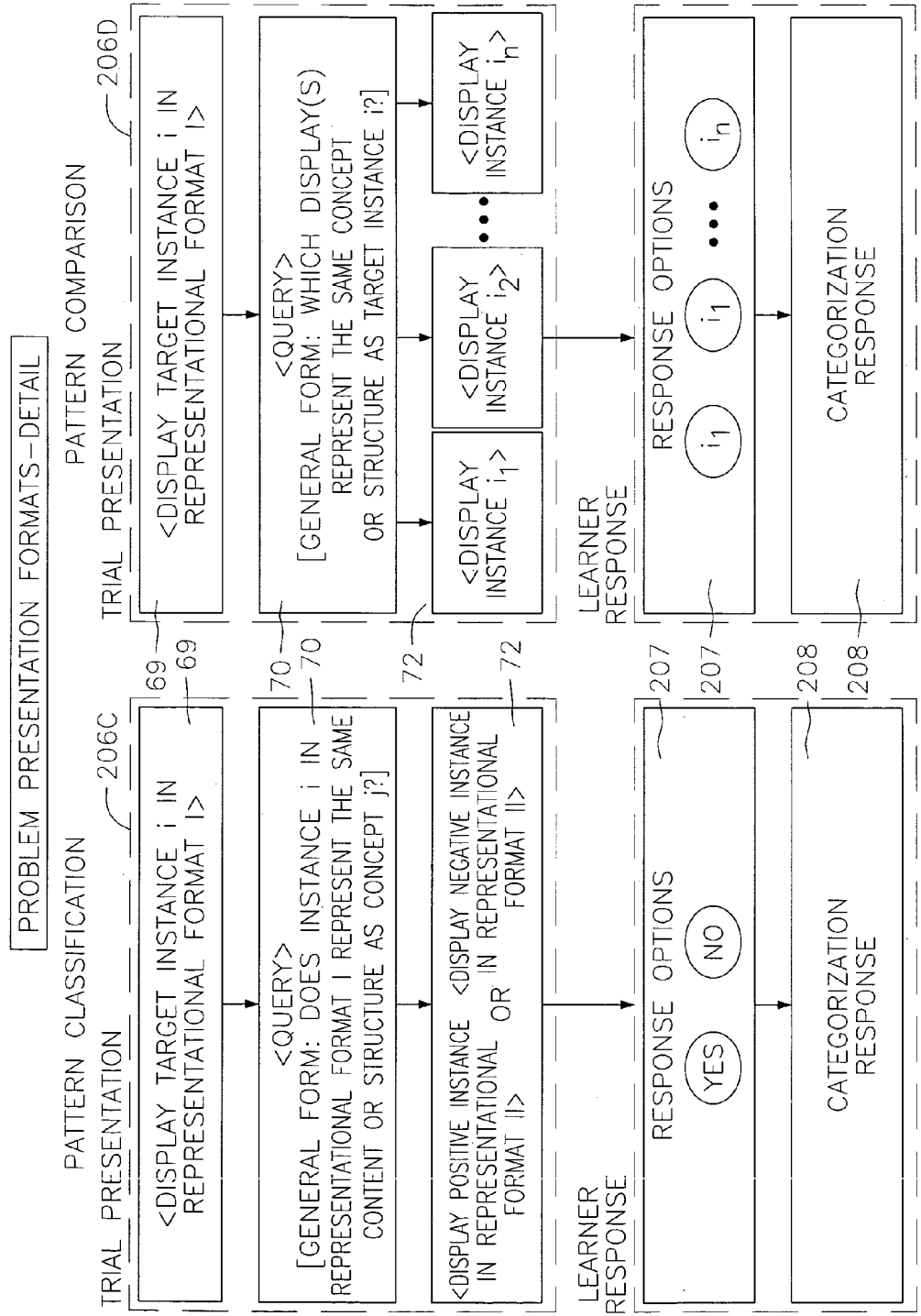
FIG. 9 is a block diagram depicting the pattern recognition and a pattern classification features of an exemplary Structure Mapping variant of a Perceptual Learning Module.

Referring now to FIG. 9, if in step 206 one embodiment of the PLM determines that the classification trial is a structure mapping trial that requires a pattern classification response, the PLM will proceed to step 206C. In step 206C, the PLM presents the student with a target concept or structure/pattern 69 in one representational format. A query 70 follows, and the PLM then presents the student with a structure/pattern 72, which either is or is not an instance of the same concept shown in step 69 but in a different representational format. The student then indicates whether the new structure/pattern corresponds to the target as it appears in the different representational format, step 207. Subsequently, the PLM proceeds to step 208 as shown in FIG. 7.

With continued reference to FIG. 9, if in step 206 the PLM determines that the classification trial is a structure mapping trial that requires a pattern comparison response, the PLM will proceed to step 206D. In step 206D, the PLM presents the student with a target concept or structure/pattern 69 in one representational format. A query 70 follows, and then the student is presented with a plurality of structures/patterns 72, in a representational format from the display shown in 69. The student then indicates which of the plurality of presented structures/patterns matches the concept of 69 in a different representational format, step 207. After the student responds, the PLM proceeds to step 208 as shown in FIG. 7.

Hinting Method

A hinting module 80 of the present invention may be used in conjunction with the optimal sequencing method 40 and/or the perceptual learning modules 60 described above. The hinting module is also suitable for integration into other learning systems. In general, the hinting module is an automated method for improving learning of specific problem types and for developing knowledge of connections among related problem types. The method is optimized by using information about the student's learning state, as accessed by accuracy and speed data.

The general method of the hinting module 80 will be illustrated using a simple mathematical example involving the subtraction of single digit numbers. A problem such as "11−5=_" appears. If the student does not enter an answer within a predetermined period or allotted amount of time, a hint automatically appears either as a visual inset on the GPC 10 display screen 12 (FIG. 1) or as an auditory prompt. The hint is automatically selected by a hinting algorithm from among several possible hint types each which is generated by a particular algorithm.

The possible hint types, one or more of which may be used in any given embodiment, may be generally classified as:

1) Inverse Operation Hints:

In the example above this might be "5+_=11." Because students usually learn addition before subtraction, this inverse prompt is likely to trigger recognition of the correct answer from the original problem. This type of hint promotes valuable understanding of the relationships between arithmetic operators.

2) Known Problem Hint:

In the example above, this kind of hint could be "12−5=_." The hint might help because the question and answer differ by only one from the initially posed problem. This hint would appear if, based on the student's prior performance data, it was known that the hint problem has already been learned. This kind of hint may help the student to build on mathematical reasoning in connecting related problems.

3) Easy Problem Hints:

In the example above this might be "10−5=_." Research suggests that some problems are learned earlier and provide a reference for learning others. Problems involving the numeral "10," for example, are special in this regard. Information of this type may be coded into the database used by the hint selection algorithm.

4) Solved Problem Hints:

Problems which are similar in various ways but have not already been learned can be used as hints by being presented along with their solutions. For the example above this could be "12−5=7." Not only does this provide a hint that may allow the student to answer 11−5, but provides a passive learning trial for 12−5. Research indicates that this kind of passive learning may be as helpful as active learning trails.

Preferably, all of the hint types are available on all learning trials. Further, it is preferable for the hinting module to keep track of previously used hints to ensure that different hint types are used about equally often. Although the overview of the hinting module 80 has used a simple mathematical problem as an example, this is not meant to be limiting. The method is equally applicable to many learning domains.

Another application in mathematics involves algebraic transformations. Suppose the student is confronting a complicated example involving a certain transformation, e.g., which of several expressions can be derived from $T=5\cos^2 x(r^2-3)$, where the correct answer is $5\cos^2 xr^2-15\cos^2 x$. A known or easy problem hint might be: "a(x−z)". A solved problem hint might be: "a(x−z)=ax−az". These hints emphasize the basic structure present in the more complicated expression.

To give an example from a different domain, the hinting algorithm could have many applications in language learning. In learning to conjugate French verbs, suppose the learner is presented with the sentence "Marie (oublier) le nombre." The task would be to put the verb—oublier—in the correct form. (The correct answer is "oblie.") Conjugation for this verb follows the pattern of regular French verbs ending in -er. Therefore, a known problem hint might be presentation as an inset on the screen of a familiar example, such as "parler." A solved problem hint would be presentation of a sentence including the related verb correctly conjugated, such as: "Jacques parle fracais." Finally, an example an inverse operation hint might be useful in a situation in which the language-learner is given a question in English (e.g., "Do you sell aspirin?") and asked to produce the same question in a foreign language. An inverse operation hint could be the declarative form of this sentence, i.e., the equivalent of "We sell aspirin." This kind of hint serves to focus attention on the transformations between sentence forms, such as declaratives and questions, passives and actives, etc., as well as allow the learners to build on their earliest learning (e.g., declaratives may be learned prior to questions, etc.)

Figure 10:
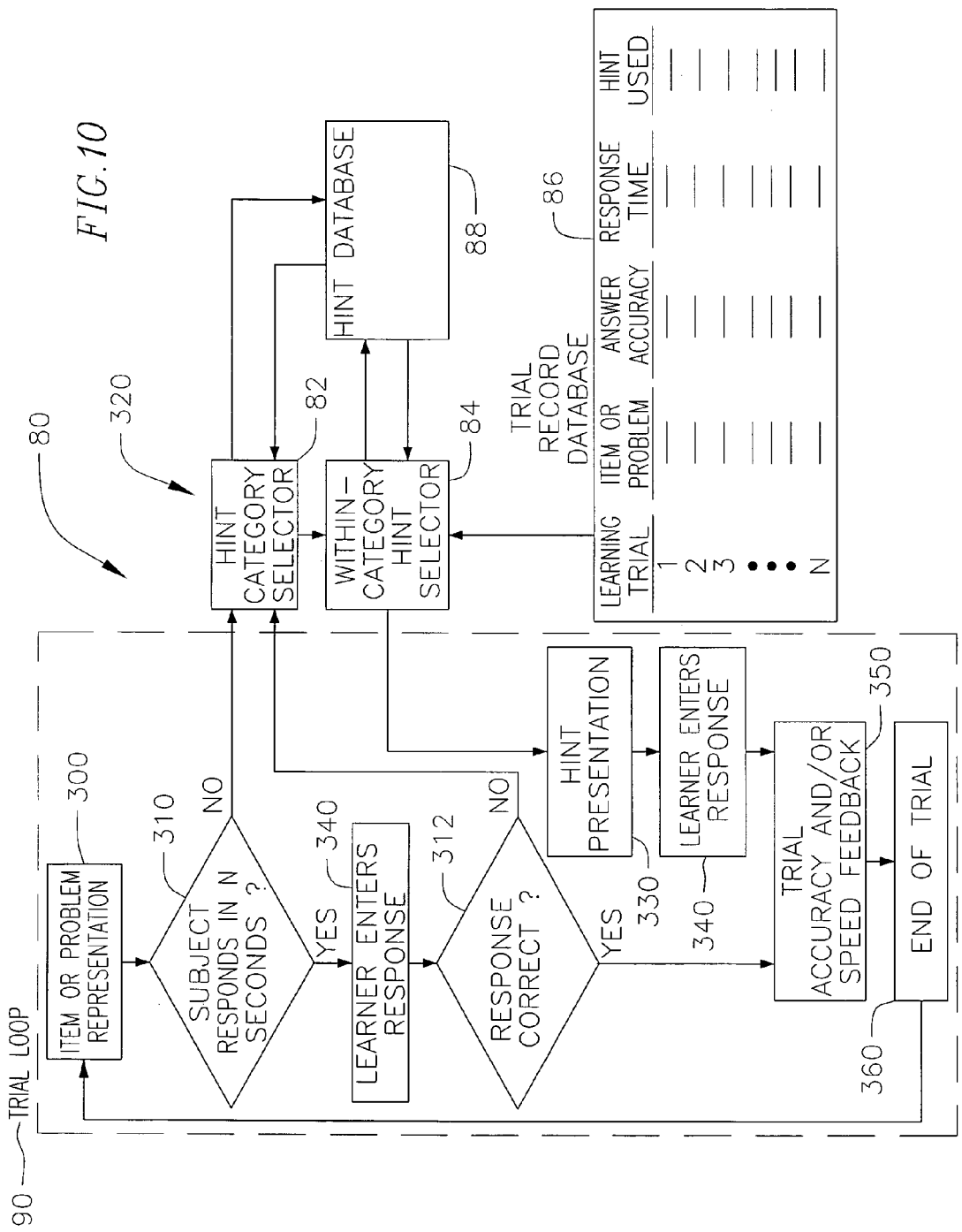
FIG. 10 is a block diagram depicting an exemplary implementation the Hinting Module of the present invention.
Figure 11:
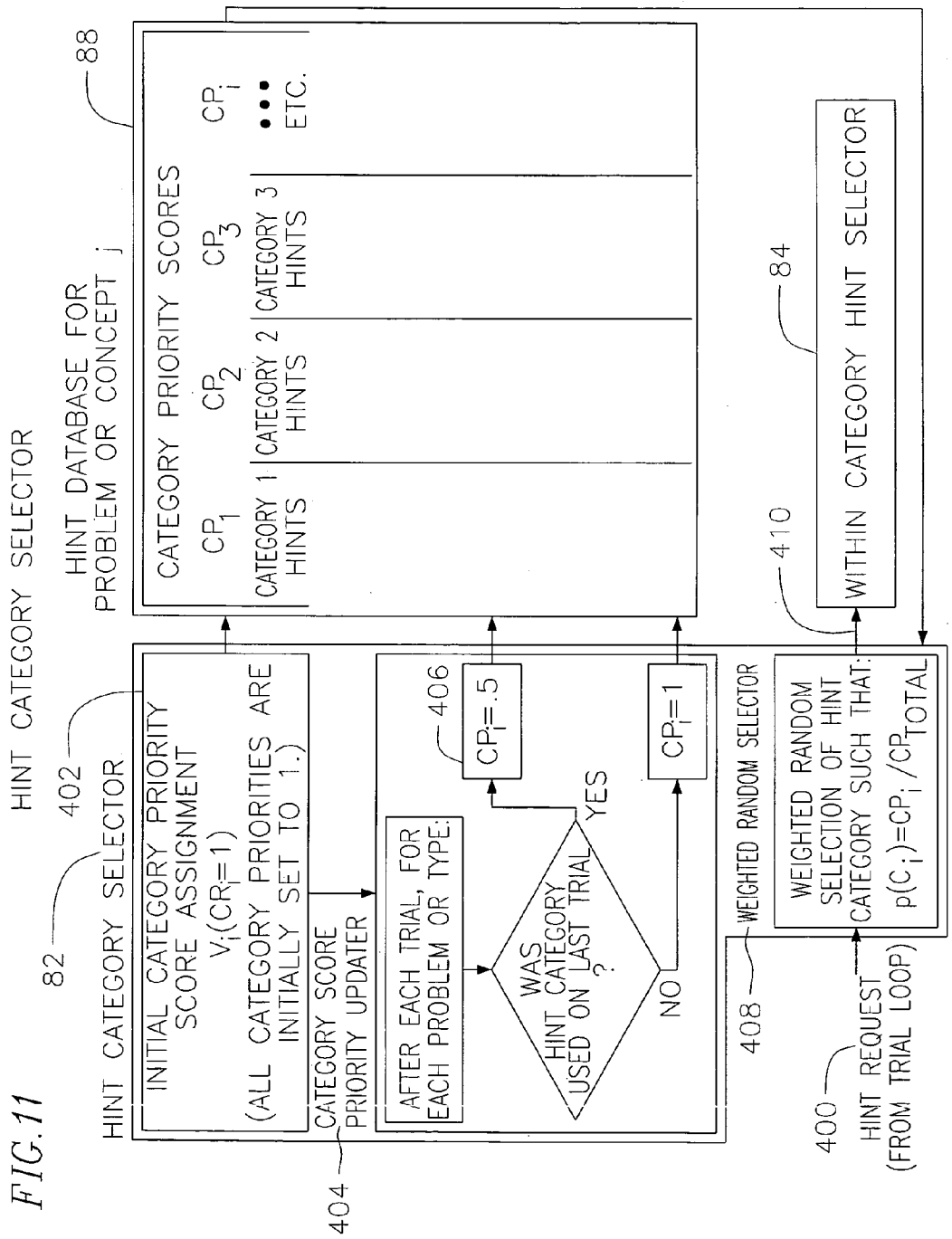
FIG. 11 is a block diagram depicting an exemplary implementation of the Hint Category Selector algorithm of the present invention.
Figure 12:
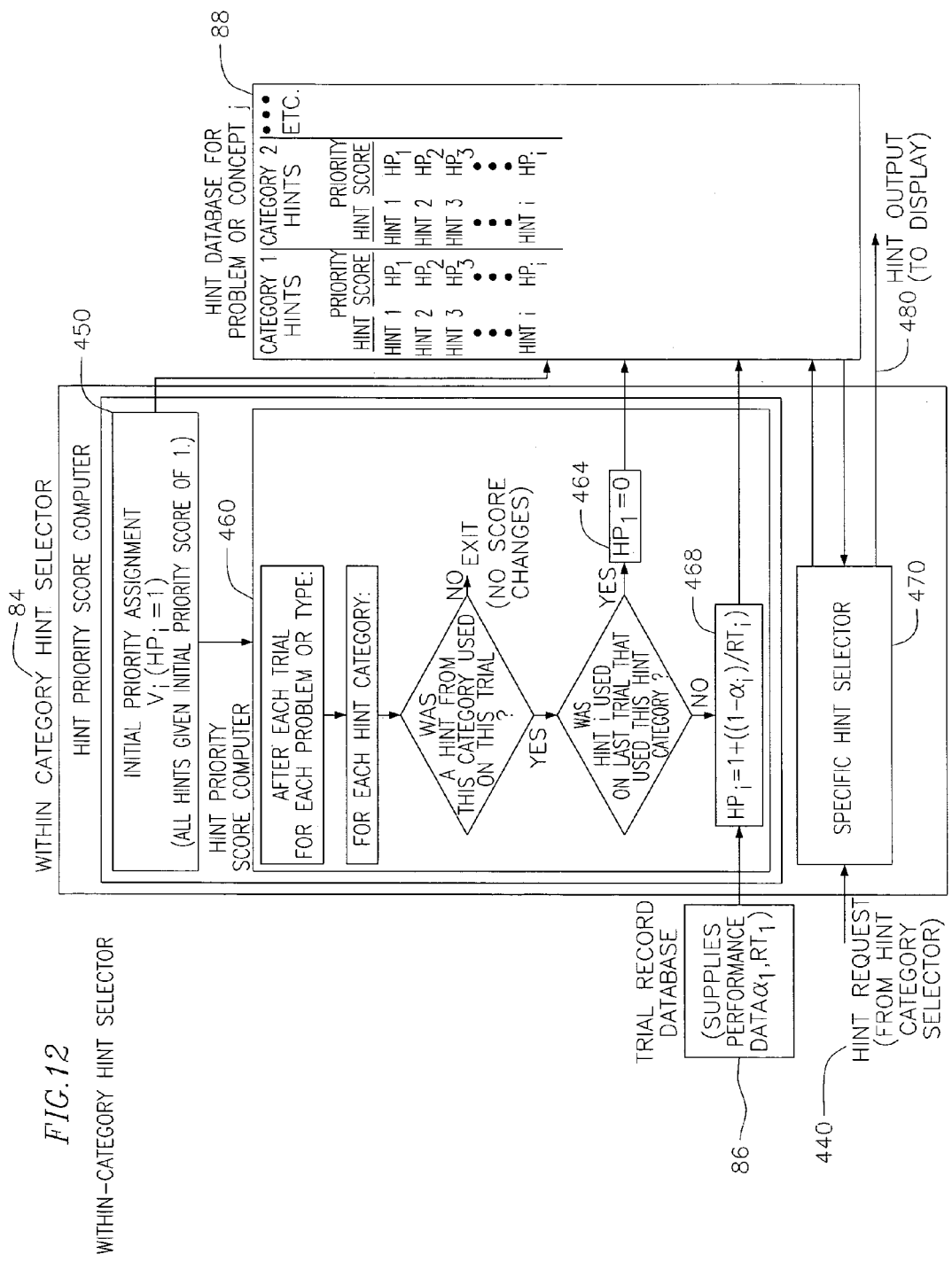
FIG. 12 is a block diagram depicting an exemplary implementation of the Within-Category Hint Selector of the present invention.

With reference to FIGS. 10–12, a hinting module 80 in accordance with the present invention is shown. Preferably, the hinting module is a software module running on the GPC 10. Generally, the hinting module includes a hint category selector 82, a within-category hint selector 84, a hint record database 86, a hint database 88, and a hinting trial loop 90. The hint selector selects hints according to an algorithm that uses the following variables: 1) the student's past performance, as measured by the student's speed and accuracy in answering problems; 2) the types of hints that have previously proven to be effective for problems of the same general type as the current learning trial; and, 3) the student's knowledge of the hint type. The performance data just described is maintained in the hint record database. The hint database maintains algorithms for developing hints based upon the particular hint types described above, i.e., inverse operation hints, known problem hints, easy problem hints, and solved problem hints.

With particular reference to FIG. 10, the hinting module 80 operates as follows. In step 300 a learning trial is presented to the student. In step 310, the hinting module waits for a predetermined period of time for the student to answer the question. This parameter is adjustable by the instructor for different learning applications and even for different learners. If the student does not answer within the allotted time period, the hinting module proceeds to step 320, where the hint category selector 82 and within-category hint selector 84 selects a hint according to the hinting algorithm. The hint is then presented to the student in step 330. In step 340, the student enter his response. In step 350, feedback regarding the student's response is presented. Subsequently, the hinting module returns to step 300 to repeat the trial loop.

In step 310, if the student does answer the question within the allotted period of time, the hinting module 80 proceeds to step 312 and evaluates whether the response is correct. If the response is not correct, the hinting module proceeds to step 320 and a hint is selected. The hint is then presented to the student in step 330. The student enters his response, step 340. Feedback regarding the response is presented, step 350, and the hinting module returns to step 300.

In step 312, if the student answers the question correctly, the hinting module 80 proceeds to step 350 and provides feedback regarding the students response to the learning trial and again proceeds to step 300. It should be noted that the provision of feedback is optional. Though typically feedback will be provided after hints and/or learning trials, there may be instances in which feedback is not desired. Furthermore, those skilled in the art will recognize that operation of the feedback module will end when the trial block of questions ends in accordance with the criteria established by the learning module in which the feedback module is being used.

Referring now to FIG. 11, the operation of the hint category selector 82, within-category selector 84, and the hinting algorithm will be described in detail with respect to this exemplary embodiment. A hint is selected when a request for a hint is generated in the trial loop 400. If there are multiple categories of hints for the test item, the category to be used is determined by the hint category selector 82. Hints associated with a particular problem (or problem type, in perceptual or concept learning applications) are stored in a hint database 88 by category (e.g., solved-problem hints, easy problem hints, etc.). Each category has a current hint category priority score. Initially 402, all categories are assigned category priority scores of 1. Category priority scores are adjusted by the priority score updater 404 to ensure use of different categories of hints across multiple hinting events associated with a particular problem or problem type. Thus after a trial on which a hint category is used, its priority score is lowered. In FIG. 11, the adjustment is reduction of the priority score to 0.5 for the category last used 406, although of course other values are possible. The weighted random selector 408 chooses among categories randomly, subject to the constraint that the probability of each category ($C_i$) is equal to the ratio of its category priority score ($CP_i$) to the total of all category priority scores ($CP_{total}$). In other words:

$$p(C_i) = CP_i/CP_{total}$$

The described operation of the Hint Category Selector decreases the probability (by ½ in this example) of a given hint category being used for successive hinting occasions for a particular problem. After one trial in which the hint category probability is reduced, it is restored to the initial value (one in this example). The user skilled in the art will readily see that many other weighting schemes are possible, including setting the probability of category recurrence (on two successive trials) to zero or maintaining a reduced probability of recurrence over several trials, rather than only one trial, after that category has been used.

The output of the hint category selector 440 goes to the within category hint selector, shown in FIG. 12. Initially, all hints within a category are set to a score of 1 at step 450. However, the scaffolding idea, described earlier in connection with the optimal sequencing algorithm, can also be used to give higher initial weights to some hints, making their appearance more probable. The priority scores for hints within a selected category incorporate information about their recent use, and where applicable, information about the user's knowledge and performance on the problems to be used as hints. Specifically, it is desirable to a) minimize repetition of particular hints on successive hinting events, and b) utilize hints that effectively engage the learner's knowledge state, e.g., using well-learned information in hinting. These goals are accomplished by the hint priority score computer 460. (The latter function—using the learner's performance data—is applicable only when items in the problem database are also usable as hints in the hint database. Other applications in which the format or content of hint information differs from the problem information will not use the performance data directly, but may use connections known or assumed between the hinting material and particular problems, as well as the constraint on repetition probability.) After each trial, for each problem or type in the problem database, the computer updates the score for the hint that was used on that trial. Specifically, the hint used on that trial is assigned 464 a hint priority score (HP) of zero. Other hints are updated according to performance data attained when they were last presented as learning problems 468. In the specific example given, they are updated according to the formula:

$$HP_i = 1 + ((1-\alpha_i)/RT_i)$$

$HP_i$ is the hint priority score for hint i. Parameters $\alpha_i$ and $RT_i$ come from the trial record database 86 and have been set forth earlier. They reflect the speed and accuracy of the learner on the last encounter with problem i. (Specifically, $\alpha_i$ takes the value 0 for problems correctly answered on their most recent presentation and takes the value 1 otherwise. $RT_i$ is the response time for the most recent presentation of the problem.) The equation increases the priority of problem i for any hint only that was accurately answered on its last presentation as a test item. The priority score increment reflects the speed of the learner's latest response to this item, such that shorter response times give a larger increment.

The specific hint selector 470 selects the specific hint (within the selected category) having the highest priority score and sends it to be displayed 480. If more than one hint is tied for the highest score, the hint is selected from among tied scores randomly (by use of a random number generator). The user skilled in the art will realize that other weighting schemes are possible.

It will be appreciated that an improved automated learning system has been presented. Among the system's many possible features are the ability to optimize the presentation of problems in order to promote rapid learning by using a student's speed and accuracy in answering questions as variables in a sequencing equation. The system also provides perceptual learning modules which develop the abilities of students to recognize and distinguish between complex patterns and/or structures, and transfer this structure knowledge to new instances. The system further provides a hinting module which promotes learning by teaching students the connections between related types of problems. It will be understood by those of ordinary skill in the art that the features described herein may all be included in a single embodiment, or may be included in separate embodiments containing one or more of the features. While only the presently preferred embodiments have been described in detail, as will be apparent to those skilled in the art, modifications and improvements may be made to the system and method disclosed herein without departing from the scope of the invention. Accordingly, it is not intended that the invention be limited except by the appended claims.

What is claimed is:

1. A learning item sequencing system for optimizing a student's learning speed, the system comprising:
   a computer including one or more memory portions;
   the memory portions comprising:
      a problem database containing a plurality of learning items, wherein a learning item is presented on each learning trial;
      a trial record database, for storing response data regarding the student's response to each learning item, wherein the response data includes data relating to speed and accuracy;
      software for implementing a trial loop, wherein the learning trials are presented to the student and response data are collected; and
      software for implementing a sequencing algorithm, wherein the algorithm sequences the learning items to be presented by associating with a learning item a priority score as a function of the response data collected from prior learning trials and makes it impossible for one or more learning items to be presented in at least one learning trial based upon the priority score associated with the learning item.

2. The sequencing system of claim 1, wherein the response data collected for each learning trial includes the student's accuracy in answering the presented learning item and the student's response speed if the item was correctly answered.

3. The sequencing system of claim 2, wherein each learning trial includes a priority score associated with the particular learning item.

4. The sequencing system of claim 3, wherein the sequencing algorithm continuously updates the priority score of each learning item based on the response data collected on the immediately preceding learning trial.

5. The sequencing system of claim 4, wherein the number of trials since a particular learning item was last presented is a variable used by the sequencing algorithm in continuously updating the priority score of each learning item.

6. The sequencing system of claim 5, wherein the software for implementing a trial loop includes a problem selector, the problem selector selecting the learning item with the highest priority score for presentation to the student.

7. The sequencing system of claim 5, wherein the sequencing algorithm prevents the same learning item from recurring for a predetermined number of trials.

8. The sequencing system of claim 4, wherein relative importance of the student's speed and accuracy in sequencing of learning items is a parameter.

9. The sequencing system of claim 8, wherein when a subset of the plurality of learning items have the same high priority score, the problem selector selects the learning item for presentation at random from the subset of learning items with the same high priority score.

10. The sequencing system of claim 8, wherein the sequencing algorithm increases the priority score for each incorrectly answered learning item, wherein the probability of each incorrectly answered learning item being again selected by the problem selector increases, whereby delay in learning item reappearance decreases.

11. The sequencing system of claim 8, wherein the sequencing algorithm decreases the priority score for each correctly answered learning item, wherein the probability of that learning item being again selected by the problem selector decreases, whereby delay in learning item reoccurrence increases.

12. The sequencing system of claim 11, wherein the sequencing algorithm decreases the priority score for each correctly answered learning item as a function of the student's response time in answering the question, wherein delay in a particular learning item's reappearance increases as the student's response time to the particular learning item decreases.

13. The sequencing system of claim 12, wherein the software for implementing the trial loop includes a learning item retirement feature, wherein the learning items are retired from the problem database upon meeting a predetermined learning criterion.

14. The sequencing system of claim 13, wherein a learning criterion for each particular learning item is a function of the student's accuracy in answering the learning item, and response speed for each correct answer, over a predetermined number of repetitions of the learning item.

15. The sequencing system of claim 14, wherein a session resumption feature stores an individual learner's data for learning items, in terms of speed, accuracy, and problem retirement status for continuing the learning during another session at a later time.

16. The sequencing system of claim 14, wherein the session resumption feature allows learning to continue at another time whence the retirement count of retired learning items is reduced, bringing them back for review and "re-retiring" if performance still meets learning criteria.

17. The sequencing system of claim 14, wherein the session resumption feature allows previously retired learning items brought back for review to rejoin the active problem set if performance criteria do not meet the previously established learning criteria.

18. The sequencing system of claim 8, wherein each learning item may be assigned an initial priority score.

19. The sequencing system of claim 18, wherein the sequencing algorithm does not modify the priority score of each item until after its first presentation.

20. The sequencing system of claim 19, wherein the initial order of appearance of all, or some, of the learning items may determined in advance by assigning all, or some, of the learning items initial priority scores in ascending or descending order.

21. The learning system of claim 1, wherein the sequencing algorithm sequences categories of learning items.

22. The learning system of claim 1, wherein the learning items comprise categories of learning items.

23. The learning system of claim 1, wherein the sequencing algorithm further includes one or more parameters selected from the group consisting of relative importance of speed and accuracy, minimum trials separating learning item recurrence, and retirement criteria, wherein one or more parameters may be adjusted to suit different learning material, tasks or individuals.

24. A learning item sequencing system for optimizing a student's learning, comprising;
  a computer including a central processing unit, a visual display device, at least one input device, and one or more memory portions;
  the memory portions comprising:
    a problem database, wherein a plurality of leammg items for presentation to the student is stored in the database, and further wherein each learning item has an associated priority score;
    a trial record database, for storing a record containing response data regarding the students response to each learning item, the response data collected for each learning item including the student's accuracy in answering each learning item and the student's response speed for each correctly answered learning item, the response data further including the number of trials since each particular learning item was last presented;
  software for implementing a trial loop, wherein the learning trials are presented to the student and the response data are collected, the software including a problem selector, wherein the problem selector selects the learning item with the highest priority score for presentation to the student; and
  software for implementing a sequencing algorithm, wherein the algorithm continuously updates the priority scores for each learning item as a function of the response data collected from the prior learning trials, the sequencing algorithm increasing the priority score for each incorrectly answered learning item and decreasing the priority score for each correctly answered learning item, wherein the probability of a particular learning item being again selected by the problem selector increases or decreases as a function of priority score and at least one learning item is rendered impossible from appearing in at least one learning trial depending on the priority score.

25. The sequencing system of claim 24, wherein the sequencing algorithm continuously updates the priority score of each learning item based on the response data collected for the immediately proceeding learning trial.

26. The sequencing system of claim 24, wherein when a subset of the plurality of learning items have the same high priority score, the problem selector selects the learning item for presentation at random from the subset of learning items with the same high priority score.

27. The sequencing system of claim 24, wherein the sequencing algorithm decreases the priority score for each correctly answered learning item as a function of the student's response time in answering the question, wherein the faster the student's response time the greater the decrease in priority score.

28. The sequencing system of claim 24, wherein the sequencing algorithm prevents the same learning item from recurring for a predetermined number of trials.

29. The sequencing system of claim 24, wherein the priority score associated with each learning item may be assigned an initial value.

30. The sequencing system of claim 29, wherein the sequencing algorithm does not modify the priority score of each learning item until after the first presentation of each particular learning item.

31. The sequencing system of claim 29, wherein the initial order of appearance of all, or some, of the learning items may determined in advance by assigning all, or some, of the learning items initial priority scores in ascending or descending order.

32. The sequencing system of claim 24, wherein the software for implementing the trial loop includes a learning item retirement feature, wherein the learning items are retired from the problem database upon meeting a predetermined learning criterion.

33. The sequencing system of claim 24, wherein the learning criterion for each particular learning item is a function of the student's accuracy in answering that learning item, and response speed for each correct answer, over a predetermined number of repetitions of the learning item.

34. The learning system of claim 24, wherein the sequencing algorithm sequences categories of learning items.

35. The learning system of claim 24, wherein the learning items comprise categories of learning items.

36. The learning system of claim 24, wherein the sequencing algorithm further includes one or more parameters selected from the group consisting of relative importance of speed and accuracy, minimum trials separating learning item recurrence, and retirement criteria, wherein one or more parameters may be adjusted to suit different learning material, tasks or individuals.

37. A method for learning item sequencing for optimizing a student's learning speed, the method comprising:
  supplying a computer including one or more memory portions;
  the memory portions having software which performs the steps of:
    building and maintaining a problem database containing a plurality of learning items;
    building and maintaining a trial record database, for storing response data regarding the student's response to each learning item, wherein the response data includes data relating to speed and accuracy;
    implementing a trial loop, wherein the learning items are presented to the student and response data are collected; and
    implementing a sequencing algorithm, wherein the algorithm sequences the learning items to be presented as a function of the response data collected from prior learning trials by associating priority scores with learning items and making it impossible for certain learning items to be presented in at least one learning trial.

38. The learning system of claim 37, wherein the sequencing algorithm sequences categories of learning items.

39. The learning system of claim 37, wherein the learning items comprise categories of items.

40. The learning item sequencing method of claim 37, wherein the step of building and maintaining a problem database containing a plurality of learning items comprises building a plurality of learning items representing categories of items.

41. The learning sequencing method of claim 37, wherein the sequencing algorithm further includes one or more parameters selected from the group consisting of relative importance of speed and accuracy, minimum trials separating learning item recurrence, and retirement criteria, wherein one or more parameters are adjusted to suit different learning material, tasks or individuals.

* * * * *

UNITED STATES PATENT AND TRADEMARK OFFICE
CERTIFICATE OF CORRECTION

PATENT NO. : 7,052,277 B2 Page 1 of 1
APPLICATION NO. : 10/020718
DATED : May 30, 2006
INVENTOR(S) : Philip J. Kellman It is certified that error appears in the above-identified patent and that said Letters Patent is hereby corrected as shown below:

Column 33, line 24, Claim 6
    Delete ",", Insert --;--

Column 34, line 21, Claim 20
    After "may", Insert --be--

Column 34, line 41, Claim 24
    Delete "leammg", Insert --learning--

Column 34, line 46, Claim 24
    Delete "students", Insert --student's--

Column 35, line 12, Claim 26
    Delete "have", Insert --has--

Column 35, line 34, Claim 31
    After "may", Insert --be--

Signed and Sealed this

Fifteenth Day of April, 2008

JON W. DUDAS
*Director of the United States Patent and Trademark Office*